Aug. 24, 1926.

A. L. RUTHVEN 1,597,545

SIMPLEX TRAIN CONTROL

Filed Feb. 14, 1923       5 Sheets-Sheet 1

Inventor:
A. L. RUTHVEN,
By Monroe C. Miller
Attorney.

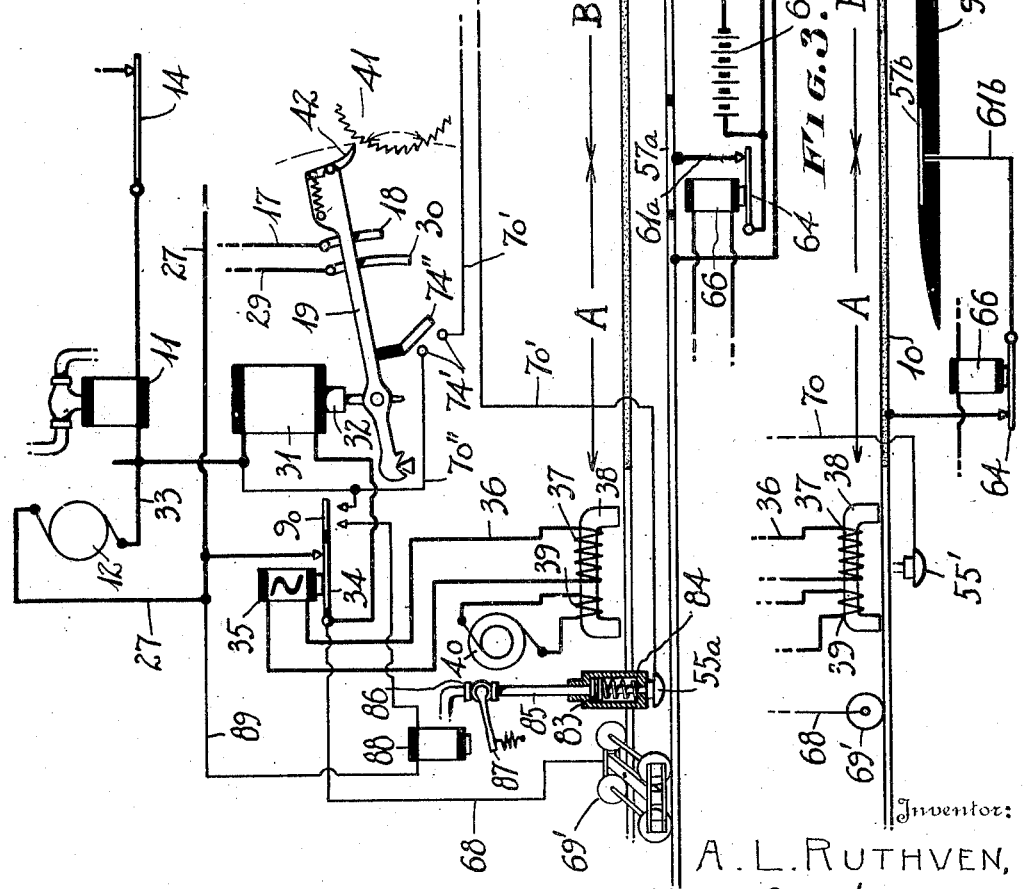

Aug. 24, 1926.
A. L. RUTHVEN
1,597,545
SIMPLEX TRAIN CONTROL
Filed Feb. 14, 1923   5 Sheets-Sheet 3
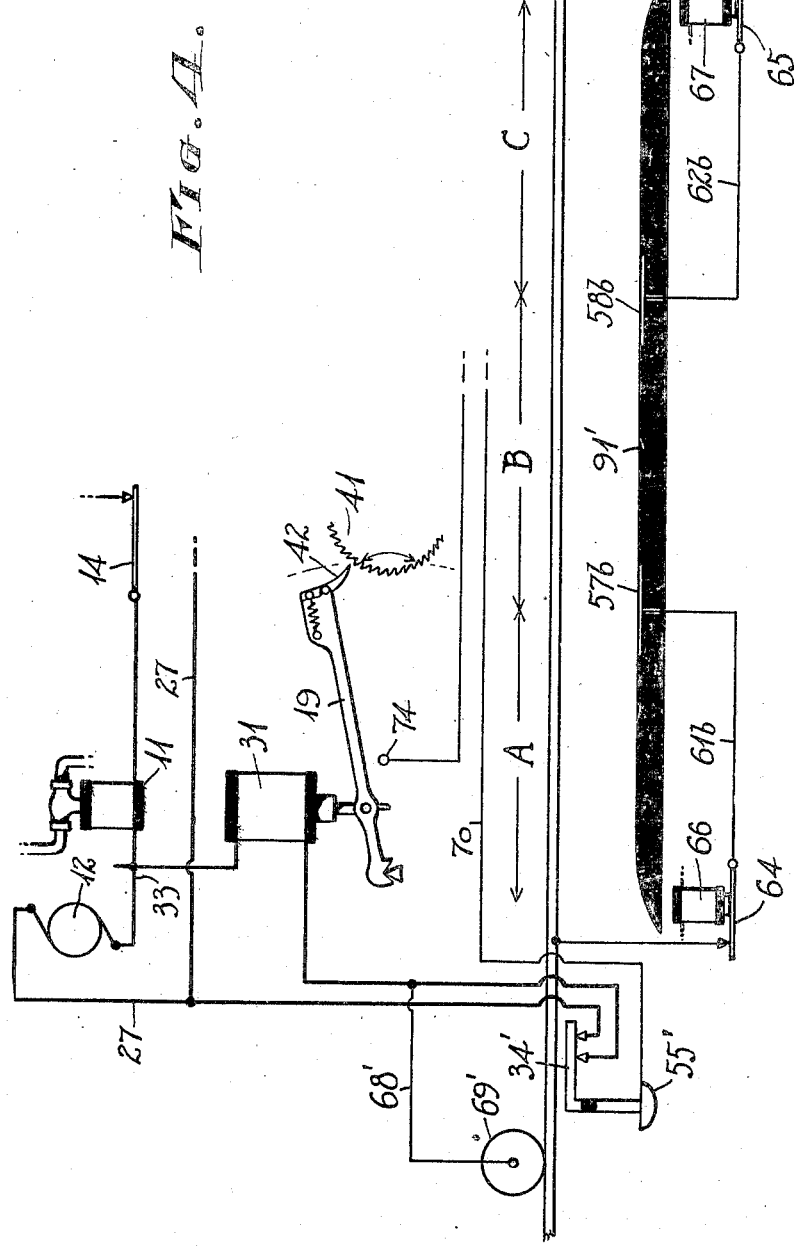
Inventor:
A. L. RUTHVEN,
By Monroe E. Miller
Attorney.

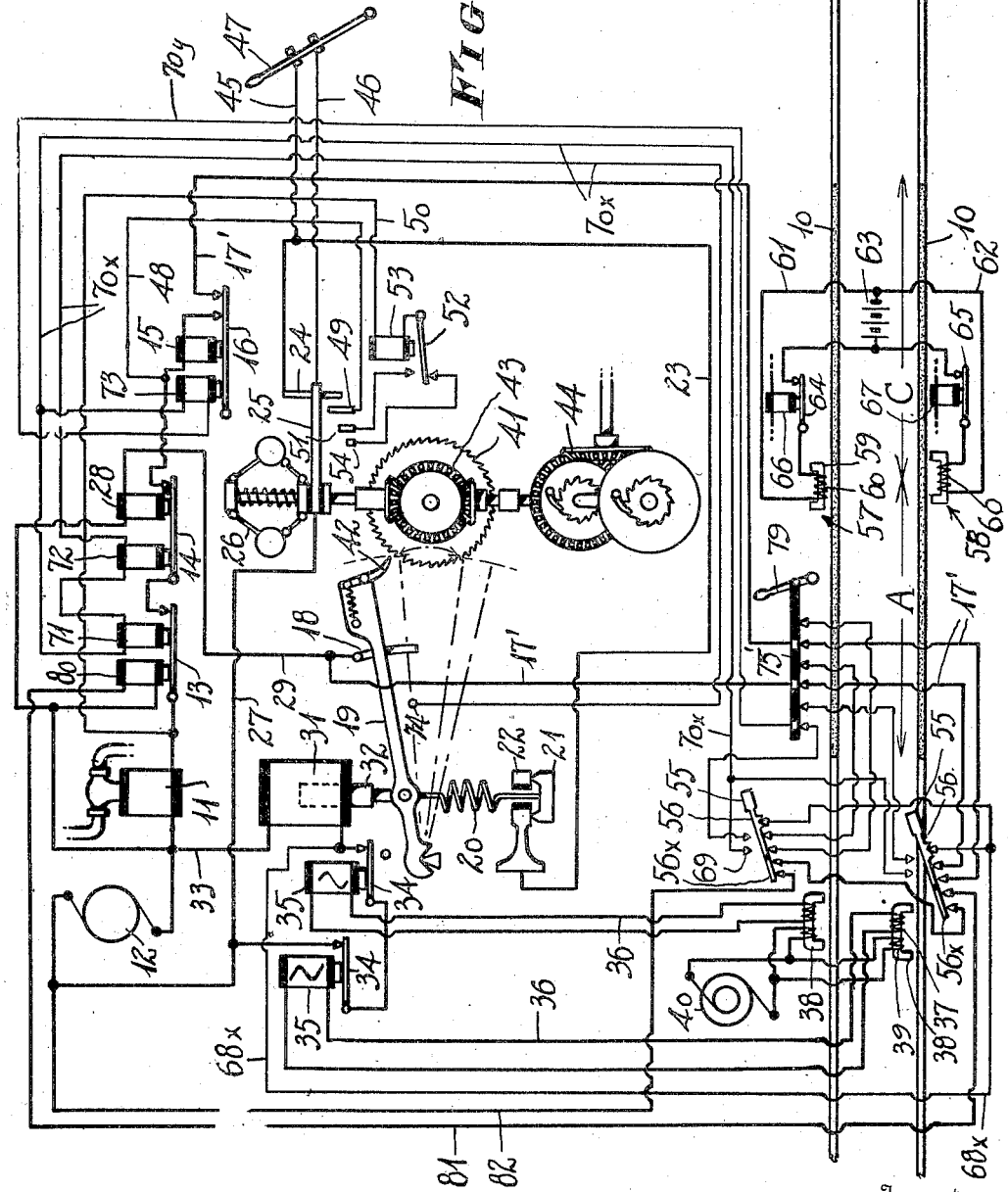

Aug. 24, 1926.
A. L. RUTHVEN
1,597,545
SIMPLEX TRAIN CONTROL
Filed Feb. 14, 1923    5 Sheets-Sheet 5
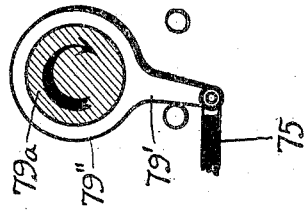
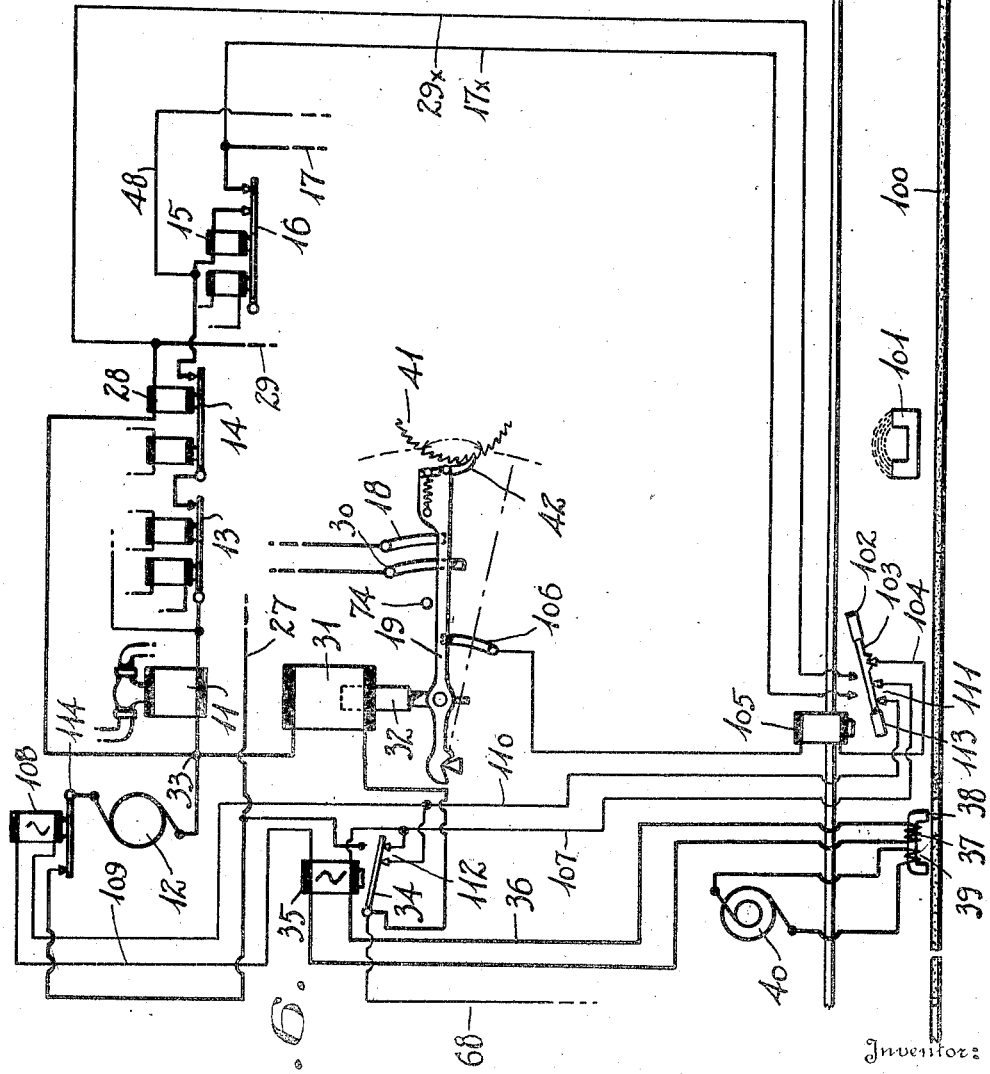
Inventor:
A. L. RUTHVEN,
By Monroe E. Miller
Attorney.

Patented Aug. 24, 1926.

1,597,545

UNITED STATES PATENT OFFICE.

ALFRED L. RUTHVEN, OF ROCHESTER, NEW YORK, ASSIGNOR TO UNION SIMPLEX TRAIN CONTROL CO., INC., OF ROCHESTER, NEW YORK, A CORPORATION OF DELAWARE.

SIMPLEX TRAIN CONTROL.

Application filed February 14, 1923. Serial No. 618,989.

The present invention relates to train controlling apparatus, and aims to provide novel improvements in such apparatus to enhance the utility and efficiency thereof.

Another object of the invention is the provision of a run-down device operable when passing a controlling station of the track for obtaining an ultimate vehicle condition, such as a danger or train stopping condition, in combination with other means operable, when passing the controlling station, for avoiding or setting aside such condition and obtaining another vehicle condition, such as caution or clear.

Another object is the utilization of a non-magnetic rail section at the controlling station, with a rail responsive device on the vehicle, for bringing the run-down device into operation, with other control elements on the track associated with said rail section for obtaining the other condition or conditions, thereby assuring of a danger or vehicle retarding condition although the other control elements fail to function, and providing for other advantages as hereinafter more fully pointed out.

A further object is the provision of novel means for obtaining clear or caution vehicle conditions when passing a controlling station, to set aside or eliminate the vehicle stopping or danger condition.

A further object is the provision of novel means for controlling the speed of the train or vehicle under caution and danger or similar conditions, enabling different maximum speeds to be enforced for such different conditions.

Another object is the provision of means requiring the train or vehicle to be stopped when a danger condition exists, and permitting the train or vehicle, after coming to a stop, to proceed below a predetermined danger speed, the train or vehicle being again stopped if such speed is exceeded.

A further object of the invention is the use of a spring for actuating one of the movable parts, with means whereby the failure of the spring, due to the breakage, removal or weakening thereof, will produce a danger condition in the vehicle equipment, to give a signal or to retard the vehicle.

A still further object is the provision of means enabling the vehicle equipment to be controlled, when passing long sections of non-magnetic rail, for suspending the danger or stopping condition, which would otherwise occur without other control elements to reset the run-down device; such means enabling the train to pass long non-magnetic rail sections, either in or out of the protected portion of the track, without unnecessary stops of the vehicle and without using control elements at intervals along the track for repeatedly resetting or restoring the run-down device.

Another object is the provision of means whereby the failure or stoppage of the run-down or similar device, due to a breakage or disconnection of the driving means therefor, will produce a danger condition, or the like, so as to assure of the run-down device being operable when proceeding.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 2 is a diagrammatical view of a second form of apparatus utilizing isolated or insulated rail sections in connection with the non-magnetic rail section.

Fig. 3 is a diagrammatical view showing a third form of apparatus using a ramp in connection with the non-magnetic rail section.

Fig. 4 is a diagrammatical view of a fourth form of apparatus using a ramp in place of a non-magnetic rail section, and means combined with the ramp for obtaining different vehicle conditions.

Fig. 5 is a diagrammatical view of a fifth form of apparatus showing the use of non-magnetic sections in both rails and control electro-magnets or inductors at the opposite sides of the track, with corresponding changes in the vehicle equipment.

Fig. 6 is a diagrammatical view illustrating the means for suspending the stopping of the train by the run-down device when passing long section of non-magnetic rail, showing said device partly run down.

Fig. 7 is a detail view showing an automatic device for operating the reversing switch.

Figure 1:
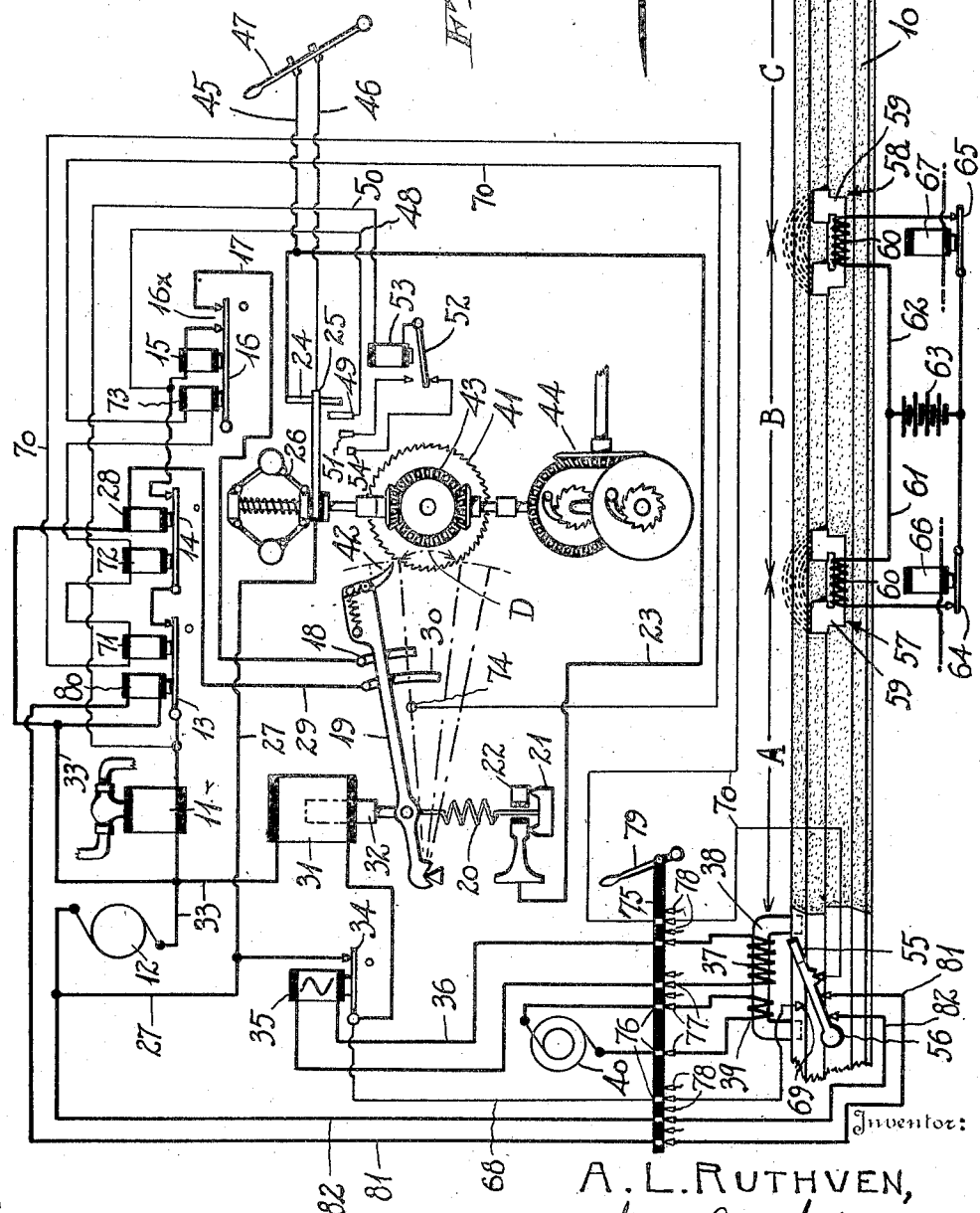
Figure 1 is a diagrammatical view of the first form of apparatus using a non-magnetic rail section at each controlling station and electro-magnets or inductors associated with said rail section.

Brief outline of apparatus.

The present apparatus is operable whenever passing a control station of the track for producing, in a positive and reliable manner, a condition in the vehicle equipment resulting in the automatic stopping or retarding of the train or vehicle, with means operable, when track elements are properly set or operative and when the several devices are functioning properly, to avoid the stopping of the train and to establish either a clear or a caution condition. When a clear condition is established, by eliminating the train stopping condition, the train can proceed without restriction, and when a caution condition is obtained, the train must then proceed below a predetermined speed. The vehicle equipment operates, in the absence of a clear or caution condition being established, to stop the train, in which event a device operates automatically to then permit the train to proceed at a restricted speed less than the speed permitted under caution control, so that after having come to a stop, the train can move ahead slowly. This will permit the train to proceed at a slow speed after a danger signal, which may be necessary or advisable, but the speed is so restricted that a stop can be made quickly. Also, when proceeding under danger speed control another stop is enforced if the allotted speed is exceeded. When the train is proceeding under either caution or danger speed control such control is maintained through the block, and will be continued into the next block if the track and train elements fail to cooperate in passing the next controlling station, thereby requiring at least the caution signalling element on the track to be in operative condition to eliminate the speed control of the train. The resetting of the vehicle equipment is therefore dependent on the response of the vehicle or train equipment to the track device, and the several elements or devices of the apparatus are so coordinated and synchronized that false clear conditions are practically impossible, and assurances had of caution or danger indications being obtained should there be vital failures in the apparatus. The danger vehicle or stopping condition is obtained by a run-down device which is released when passing non-magnetic rail sections of sufficient length, such as provided at controlling stations, thereby obtaining such condition unless such device is reset or restored, and such condition not being established when passing non-magnetic crossings, frogs and switch points, or other short non-magnetic sections in the rails.

Normal running circuit.

Reference being had to the apparatus shown in Fig. 1, the vehicle equipment includes an electromagnet 11 which controls an air valve or other device, so that when said magnet is deenergized the brakes are applied, the steam, electrical or other power shut off, or both, so that such magnet must be kept energized in order that the locomotive can proceed. The circuit of the magnet 11 of the electro-pneumatic valve or other controlling device includes a direct current generator 12, or other source of electrical energy, to which one terminal of the magnet 11 is connected, a switch 13, a switch 14, a caution electro-magnet 15, a switch 16 attracted by said magnet 15 against contacts 16* in said circuit, a conductor 17, a contact strip 18, a lever 19, a spring 20 connected to said lever to assist gravity in swinging the lever downwardly, a weight 21 suspended by said spring, a contact 22 engaged by said weight, a conductor 23, a contact strip 24 engaged by a brush or finger 25 carried by a speed governor 26, and a conductor 27 leading from the brush 25 to the generator 12. Such circuit of the magnet 11 may therefore be opened by the opening of any of the switches 13, 14 and 16, by the downward movement of the lever or switch 19 away from the contact strip 18, by the separation of the weight 21 from the contact 22, by the breakage or removal of the spring 20, or by the stopping of the governor 26, the strip 24 being of such a length that when the governor is stopped the brush 25 is moved below the lower end of said strip 24.

Another circuit, the greater portion of which is in common with the circuit just described, includes the generator 12, conductor 33, danger electro-magnet 28 holding the switch 14 closed, a conductor 29, a contact strip or segment 30 also engaged by the lever or switch 19 and longer than the strip 18, spring 20, weight 21, contact 22, conductor 23, contact strip 24, brush 25 and conductor 27. This circuit is broken by the movement of the lever 19 downwardly away from the strip 30, the separation of the weight 21 and contact 22, the breakage or removal of the spring 20, or the movement of the brush 25 below the strip 24 when the governor is stopped. The opening of the switches 13, 14 and 16 will not affect the opening of the second normal circuit, inasmuch as the magnet 28, conductor 29 and strip 30 form a shunt parallel with the switches 13, 14 and 16, the magnet 11, conductor 17 and strip 18.

*Run-down device.*

The lever or switch 19 forms part of a run-down device which is operable when passing a controlling station to obtain caution and danger conditions in succession by the removal of the lever 19 from the contact strips 18 and 30, respectively. The lever 19, when released, will swing down by gravity, assisted by the spring 20 which urges said lever downwardly.

The run-down movement of the lever or member 19 is in proportion to the speed or motion of the train or vehicle when passing the controlling station, and both the speed and amount of movement of the lever 19 depend on the speed and amount of movement of the train, whereby to obtain a coordination of the several elements or devices, and to also enable the vehicle equipment to pass manganese bronze or other non-magnetic crossings, frogs, switch points, and the like, without obtaining vehicle retarding conditions.

The run-down device includes, as shown, a rotary wheel 41 or other equivalent member, which has a notched or toothed edge for the engagement of a spring-pressed pawl 42 carried by and pivoted to the lever 19, said pawl being yieldingly projected to engage the toothed edge of said wheel 41 when the lever is released. The arc of movement of the end of the pawl overlaps or intersects the path of movement of the toothed edge of the wheel, so that when the lever 19 is released the pawl 42 will immediately drop on the toothed edge of the wheel 41. Said wheel is rotated in proportion to the speed and distance of travel of the vehicle, so that the downward movement of the lever 19 will be in proportion to such speed and distance of travel of the vehicle. The pawl 42 engaging the corresponding tooth of the wheel 41 will also be moved downwardly positively by the frictional contact between the pawl and wheel, to assure of the lever 19 being moved downwardly in addition to the influence of the weight of the lever and the tension of the spring 20. The pawl 42 is disengaged from the wheel 41 when the lever 19 has moved downwardly over half way, the vehicle having travelled a predetermined distance, so that the lever 19 is removed from the contact strip 18 just before the pawl 42 is disengaged from the wheel 41. When the pawl 42 is removed from the wheel 41, after the wheel 41 has rotated through a predetermined angle determined by the corresponding distance of travel of the vehicle, the lever 19 can drop away from the contact strip 30. Should the pawl 42 or wheel 41 be broken away or removed, the lever 19 when released will be free to swing downwardly at once to establish a danger condition by the removal of the lever 19 from the strip 30.

The run-down device is operatively connected to a wheel of the vehicle or other rotating member which moves according to the movement of the vehicle. Thus, as shown, the wheel 41 is integral with a gear wheel 43 that is connected by suitable gearing 44 with a wheel, axle or other corresponding rotary member of the vehicle, whereby the wheel 41 is rotated in proportion to the speed and distance of travel of the vehicle, the gearing 44 rotating the wheel 41 in either direction of travel of the vehicle, whereby the wheel 41 always rotates in the same direction whether the vehicle is proceeding with one end forward or the other.

*Resetting device.*

A device is provided for resetting the lever or member 19 to its raised or initial position and for holding said lever in such position. As shown, this device includes a solenoid or electro-magnet 31 which attracts a core or armature 32 connected to said lever, whereby the solenoid when energized will raise the core 32 and lever 19. When the solenoid is deenergized the lever 19 will swing downwardly by gravity and spring influence to remove said lever from the contact strips 18 and 30, the movement of the lever 19 away from the strip 18 opening the circuit through the caution magnet 15, to let the switch 16 drop, and the further downward movement of the lever 19 away from the strip 30 opening the circuit through the danger magnet 28 to let the switch 14 drop.

The solenoid or magnet 31 is normally energized being disposed in the normally closed circuit including the generator 12, conductor 33, solenoid 31, switch 34 under the influence of an alternating current electro-magnet 35, and conductor 27. The switch 34 thus controls the circuit of the solenoid 31 to release the run-down lever or member 19 when the switch 34 is opened, and to restore or reset said lever when the switch is closed to energize the solenoid.

A safety measure is provided in order that the removal, breaking or weakening of the spring 20 will give an indication or produce a condition that will avoid the vehicle proceeding with such spring absent or inoperative. This is for the purpose of assuring of the spring being operative and functioning when the vehicle is proceeding.

As shown, the spring 20 is coiled and stretched or under tension, one end of the spring being connected to the lever 19 and the other end being secured to the weight 21. The spring tends to swing the lever 19 downwardly and to raise the weight 21, or to move said lever and weight toward one another, the movement of the lever 19 being prevented when the solenoid 31 is energized, and the weight 21 bearing against the contact or bracket 22, to keep the circuits of the magnets 15 and 28 closed at this point. The provision of the weight 21 serves as a protection for the spring, assuring of the spring being in operative condition to prevent the circuits of the magnets 15 and 28 being opened. Thus, if the spring should break or be removed the circuits of the magnets 15 and 28 would naturally be opened, to obtain a danger condition. Should the spring weaken or set so as to lose its tension, the weight 21 would be permitted to drop away from the contact 22, thereby opening said circuits. With the spring set or weakened, the slightest downward movement of the lever 19 would permit the weight 21 to separate from the contact 22, and the failure of the spring will therefore result in the circuit of the magnet 11 being opened without fail. The spring 20 can therefore be used in addition to or in lieu of a weight, and the use of a spring is desirable because it has less inertia effect on the lever 19 than a weight would have, the spring moving the lever downwardly with a sharp action, and also permitting the lever to be raised quickly, whereas a weight might have a less rapid movement because of its inertia.

Releasing device.

The lever or member 19 of the run-down device is released whenever passing a non-magnetic rail section, so as to start the run-down operation to obtain the ultimate or danger condition, unless said run-down device is restored or reset. The run-down device may operate at other times, however, such as by the failure of current in the solenoid 31, by the stopping or failure of the generator 12, or the breaking, grounding or shorting of the circuit of said solenoid, or the like.

In order to release the lever 19 when passing control stations of the track, a rail section 10 of manganese bronze or other non-magnetic material is interposed in one rail of the track at each controlling station, to provide for inductive interruption to obtain a danger or train stopping condition whenever passing a controlling station, which inductive interruption may be likened to the breaking or interruption of a circuit.

The magnet 35 is controlled by a primary responsive device or element carried by the vehicle, which has an inductive relation with the rail of the track in which the non-magnetic rail section 10 is disposed, whereby the inductive interruption offered by the rail section 10 will inductively affect such primary responsive device or element to sufficiently deenergize the magnet 35 to let the switch 34 drop open, thereby deenergizing the solenoid 31 by letting the circuit thereof open, so that the lever 19 will drop. As shown, the primary responsive element is in the form of a step-up transformer, including a secondary coil or winding 37 on a core 38 and connected in the circuit 36 of the magnet 35, and a primary coil or winding 39 on said core connected in circuit with the alternating or changing current generator 40. The core 38 is of U-shape, as shown, with its ends directed toward the rail, whereby the iron or magnetic rail will complete the magnetic circuit for the transformer between the ends of the core 38, for the maximum or full energization of the circuit 36, including the magnet 35, when the primary responsive device is moving along the iron or magnetic portion of the rail. The ends of the core 38 can be extended downwardly at the inner side of the rail in the path of the wheel flanges when magnets or inductors, as hereinafter described, are assembled with the rail section. When the core 38 passes a non-magnetic rail section the magnetic circuit of the transformer is broken or interrupted between the ends of the core 38, thereby increasing the magnetic impedance in the core 38, and materially decreasing the current flowing in the circuit 36, whereby the magnet 35 is sufficiently deenergized to drop the switch 34. This occurs whenever the core 38 is away from the iron or magnetic portion of the rail, and assures of a positive and reliable danger producing or train stopping condition unless other devices operate properly to avoid such condition, when passing a control station. Such primary responsive device or element is thus inductively responsive to the rail so that the interruption of an inductive relation between the responsive device and rail, such as caused by the presence of a non-magnetic rail section, will, like the breaking or opening of a circuit, result in the magnet 35 releasing the switch 24 to open the circuit of the solenoid 31. The lever or switch 19 is therefore released whenever passing a non-magnetic rail section and unless said lever is picked up or reset a danger condition will be established.

Speed control governor.

A centrifugal governor 26 is provided for controlling the speed when proceeding under caution or danger conditions, and in order to protect the vehicle equipment against failure of the governor while the vehicle is in motion, and to also assure of the run-down device being operable, the governor is geared to the run-down device, so that the governor is only operated when the wheel 41 of the run-down device is turning, thereby giving assurance of the run-down device being in operation when the governor is operating. As shown, the governor 26 is geared to the gear wheel 43. Should the operative connection between the run-down device and wheel, axle or other driving member become broken or opened, so as to stop the run-down device, which would prevent the lever 19 from moving downwardly, the governor would also be stopped, the operation of the governor depending on the operation of the run-down device. When the governor stops the brush 25 is moved downwardly away from the strip 24, thereby opening the circuit of the magnet 11 to stop the train.

In order to prevent the circuit through the strip 24 and brush 25 being opened when the vehicle is intentionally stopped, means is provided for bridging the gap between said strip and brush when an intentional stop is made. Thus, as shown, a branch conductor 45 is connected to the conductor 23, and a branch conductor 46 is connected to the brush 25, and said conductors are bridged by the throttle lever or control member 47 of the locomotive or vehicle, when said lever or member is returned to initial position to shut off the power. In this way, when the lever 47 is moved to shut off the power, for bringing the vehicle to a stop, said lever bridges the contact strip 24 and brush 25, so that when the governor is stopped by the stopping of the vehicle, the circuit will not be broken at this point. This will prevent the magnet 11 being deenergized when the train is stopped purposely, but if the train is started by moving the lever 47, and the governor 26 fails to operate to again raise the brush 25 into engagement with the strip 24, the circuit will remain open between said strip and brush. The lever 47 having been removed from the conductors 45 and 46 will also open the circuit between said conductors, resulting in the magnet 11 being deenergized. The governor 26 must therefore be operating when the train is moving, and protection is therefore provided for the governor to assure of its operation. An intentional stop can be made without the train being locked against further movement inasmuch as the governor stops with the stopping of the train, but the throttle or controlling lever 24 being in initial position, during the non-movement of the train, eliminates the application of the brakes as would otherwise occur if the governor were not operating and the lever 47 moved to apply the power. When the lever 47 is moved to apply the power, it remains, for a short distance of movement, in engagement with the terminal contacts of the conductors 45 and 46, so that the train can be started to bring the brush 25 into engagement with the strip 24, before the lever 47 leaves the conductors 45 and 46.

Caution speed control circuit.

Caution conditions prevail in the vehicle equipment when the lever 19 has been removed from the contact strip 18, to open the circuit of the caution magnet 15 so as to permit the switch 16 to drop open, said switch remaining open to enforce caution speed control until said switch is again closed. Under the stated conditions, the circuit of the magnet 11 includes a speed control shunt paralleling the magnet 15 and switch 16, which circuit is the caution speed control circuit. This circuit includes the generator 12, magnet 11, switches 13 and 14, conductor 48 connected between the switch 14 and magnet 15, a contact strip 49 arranged to be engaged by the brush 25 when the vehicle is travelling below a predetermined speed (say from fifteen to thirty miles per hour or less), brush 25, and conductor 27. The strip 49 is of such a length that the brush 25 will be removed therefrom, to open such caution control circuit, when the allotted speed is exceeded, thereby deenergizing the magnet 11 to apply the brakes. Caution speed control therefore obtains when the switch 16 is open, and if the speed of the vehicle exceeds the maximum caution speed allowed, the brush 25 is lifted off the contact strip 49, thereby opening the circuit of the magnet 11 and applying the brakes until the speed is reduced to return the brush 25 to the strip 49.

Danger speed control circuit.

A more reduced speed is required under danger conditions than under caution conditions, and the train must be brought to a stop before it can proceed, after a danger indication is received by the vehicle equipment, this being brought about by the movement of the lever 19 away from the contact strip 30, to open the circuit of the magnet 28 so as to permit the switch 14 to move open. A danger speed control is enforced when the switch 14 is open and will continue until said switch is again closed. The danger speed control circuit shunts the magnet 28 and includes the generator 12, magnet 11, a conductor 50 connected between the magnet 11 and switch 13, an electro-magnet 53, a switch 52 under the influence of said magnet 53, a contact 54, the brush 25 with the governor stopped, and conductor 27. Such circuit is only closed when the vehicle has been brought to a stop, to bring the brush 25 against the contact 54, said brush and contact only engaging one another when the governor has come to a complete stop. The danger speed control circuit changes, when the vehicle has been brought to a stop, so as to permit the vehicle to proceed at a slow speed, (say from five to twelve miles per hour). A contact strip 51, shorter than the contact strip 49, is arranged to be engaged by the brush 25 when the train is travelling under the maximum danger speed, and when the magnet 53 is energized, the switch 52 is disconnected from the contact 54 and connected with the danger contact strip 51. The danger speed control circuit now includes the generator 12, magnet 11, conductor 50, magnet 53, switch 52, danger contact strip 51, brush 25 and conductor 27. The vehicle can then proceed below the maximum danger speed, and if such speed is exceeded, the brush 25 being removed from the strip 51, will not only deenergize the magnet 11, but will also deenergize the magnet 53, letting the switch 52 drop. This will open the circuit through the contact strip 51, thereby keeping the brakes applied until the train is again brought to a stop to return the brush 25 to the contact 54, in which event the switch 52 is again lifted into connection with the strip 51 so that the vehicle can again proceed under danger speed control. A stop will be enforced, however, whenever the danger speed is exceeded.

The danger speed control prevails whenever the switch 14 is open, and said switch is moved sufficiently far away from the field of the magnet 28, so that said switch cannot be lifted and closed by the magnet 28 even though said magnet is reenergized by the lifting of the lever 19 to again engage the contact strip 30. The switch 14 therefore remains open and enforces danger speed control until said switch is closed by some other medium (the magnet 72 hereinafter described).

The speed permitted under danger conditions is sufficiently slow to enable a quick stop to be made, but the train can proceed, should the apparatus be out of commission or other contingency exist, for otherwise the train might be locked against any advance movement with the brakes set.

Unless the lever 19 is restored or reset, when the primary responsive device is passing the rail section 10, a danger condition will be established by the movement of the lever 19 away from the contact strip 30.

*Track control elements.*

As shown in Fig. 1, the control elements on the track are associated with the non-magnetic rail section 10, and comprise electro-magnets or inductors 57 and 58, each of which includes a core 59 and a coil or winding 60 thereon. As shown, the cores 59 are U-shape and have their poles disposed at the tread of the rail section 10 at the outer side of said rail, and said cores can be fastened or secured in any suitable manner to the rail section 10. The control elements of the track can therefore be assembled with or attached to the rail section 10, and are disposed at that side of the rail section opposite to the side along which the primary responsive device moves, so as to prevent the primary responsive device being affected by the control electro-magnets or the cores thereof. However, the control electromagnets can be located away from the rail at the side or center of the track, and the secondary responsive device (described hereinafter) is such as to respond to the track magnets or inductors. The cores 59 are such as not to remain magnetized when the circuits of the coils 60 are opened, so that there is no residual magnetism in said cores for influencing the secondary responsive device in passing over the track magnets with their circuits broken. The coils 60 of the track magnets 57 and 58 are disposed in the respective circuits 61 and 62 with the track battery 63 or other sources of electrical energy, and said circuits include the respective switches 64 and 65 held closed when the corresponding track electro-magnets 66 and 67 are energized. Said magnets 66 and 67 are located in the corresponding circuits of signal or semaphore apparatus (not shown), whereby under clear conditions both coils 60 are energized with the magnets 66 and 67 energized and the switches 64 and 65 closed; the magnet 67 being energized and the magnet 68 deenergized when caution conditions exist, with the first control magnet 57 deenergized and the second control magnet 58 energized; and both electro-magnets 66 and 67 deenergized under danger conditions, to deenergize both control magnets 57 and 58. The electromagnets will also be deenergized by failure of current, accidental breaking or shorting of the circuits 61 and 62, or the failure of the magnets 66 and 67 to hold the switches 64 and 65 closed, the track circuits being normally closed.

The control magnets 57 and 58 are preferably spaced longitudinally from one another and from the ends of the rail section 10 the equal distances A, B and C.

*Resetting circuit.*

The secondary responsive device or element carried by the vehicle comprises, in the embodiment of the apparatus as shown in Fig. 1, an armature 55 magnetiaclly responsive to the control magnets 57 and 58. Such armature 55 is carried by a weighted lever 56 mounted for oscillation and to pass over the track magnets 57 and 58, said control magnets when energized creating magnetic fields in the path of the armature 55 to attract said armature to the control magnets. However, when the control magnets 57 and 58 are deenergized, the armature 55 will fail to be attracted to said control magnets.

The attraction of the armature 55 to a control magnet on the track will establish a resetting circuit, and the response of the armature 55 to an energized control magnet is also used for restoring or resetting the vehicle equipment, to terminate the speed control, but not unless one of the magnets 57 and 58 is energized and the armature 55 responds thereto. Such resetting circuit includes the generator 12, conductor 33, solenoid 31, a conductor 68 connected between the solenoid 31 and switch 34, a contact 69 engaged by the switch or lever 56 when the armature 55 is attracted to the track magnet, switch 56, conductor 70 having electromagnets 71, 72 and 73 therein, a contact 74 to be engaged by the lever or switch 19 in a predetermined position thereof, said lever 19, spring 20, weight 21, contact 22, conductor 23, contact strip 24, brush 25, and conductor 27. Such circuit of the solenoid 31 bridges or shunts the switch 34, which is open while passing the non-magnetic rail section, in order that the solenoid 31 be energized for resetting the lever 19. Before such circuit can be closed, however, the lever 19 must have been released from the solenoid 31 and must have moved downwardly proportionately to the movement of the vehicle, and with the proper operation, the lever 19 will engage the contact 74 at the same time that the responsive devices or elements pass the first magnet 57. Then, the lever 19 engaging the contact 74 and the armature 55 being attracted to the magnet 57 when energized, will close the circuit of the solenoid 31, so that the lever 19 is lifted back to normal or initial position, the pawl 42 dragging back across the teeth of the wheel 41. This circuit is opened immediately by lifting of the lever 19 away from the contact 74, and by the opening of the switch 56 when the armature 55 leaves the magnetic field, so that the solenoid 31 is therefore again deenergized to let the lever 19 drop, and it again starts on its downward movement. By the time the responsive devices reach the second magnet 57, the lever 19 will again engage the contact 74, so that if the armature 55 is attracted by the energized magnet 58, the solenoid 31 is again energized to lift the lever 19. When the lever 19 is thus lifted twice, in passing the control station, a clear condition is obtained, by stepping out of the danger condition, by such repeated restoration or resetting of the lever 19, but if the lever 19 is only reset or restored once when the armature 55 passes the energized magnet 57, with the magnet 58 deenergized, a caution condition is established, as will appear more fully hereinafter. With both magnets 57 and 58 deenergized a danger condition is obtained in the vehicle equipment as hereinafter described.

The magnets 72 and 73 are associated with the respective danger and caution switches 14 and 16 in order to raise said switches when the circuit of the conductor 70 is closed as aforesaid, to clear the vehicle equipment in the event that the magnets 57 and 58 are energized, so that the failure of the armature 55 to respond to a track magnet will leave the vehicle equipment under speed control if such condition existed when approaching the control station, even without anything else happening. This requires the cooperation of the secondary responsive element or device with the track elements to remove the speed control.

As a safety feature, the magnet 71 is arranged to attract the switch 13 and hold it closed, and a second electro-magnet 80, which is normally energized, holds the switch 13 closed. The circuit of the magnet 80 includes a conductor 81 connected to the magnet 80, the switch 56, a conductor 82, generator 12, and conductor 33. The switch 56 in its normal position bridges the gap between the conductors 81 and 82 to keep the magnet 80 energized. When the armature 55 is attracted to a track magnet, the magnet 80 is deenergized by the opening of its circuit, and the switch 13 would drop open if the magnet 71 were not energized at the same time that the magnet 80 is deenergized.

The magnets 71 and 80 have drop-away characteristics of sufficient duration to hold the switch 13 closed while one magnet is deenergized during the closing of the circuit of the other magnet. Thus, when the switch 56 is removed from the conductors 81 and 82 against the contact 69, thereby opening the circuit of the magnet 80, and resulting in the magnet 71 being energized, the magnet 80 is sufficiently slow-acting when becoming deenergized, to hold the switch 13 until the magnet 71 becomes energized. Conversely, when the switch 56 moves away from the contact 69 against the terminals of the conductors 81 and 82, to deenergize the magnet 71, said magnet is sufficiently slow-acting when becoming deenergized, to hold the switch 13 closed until the magnet 80 is again energized. The response of the armature 55 will ordinarily energize the magnet 71 to hold the switch 13 closed if the operation of the apparatus is proper, but if the switch 56 is moved at the wrong time or remains open, excepting when the lever 19 is passing the contact 74, the magnet 71 will not be energized and the magnet 80 being deenergized will let the switch 13 open and thereby open the circuit of the magnet 11 to stop the train, the same as when the switch 14 is opened.

Reversing switch.

In order that the vehicle equipment will be controlled when the vehicle or locomotive is proceeding with either end forward, it is of course essential to have a pair of the responsive devices at each side of the locomotive, i. e., associated with each rail, and a reversing switch 75 is used for changing the connections from one set of responsive devices to the other, as will be apparent. The switch 75 has contacts 76 to which the conductors are connected which lead to the several magnets and devices of the vehicle equipment, and the contacts 76 normally engage contacts 77 for the set of responsive devices at the corresponding side of the vehicle or engine. The switch 75 is connected to the reversing lever 79, so that when said lever is swung to reverse the direction of travel of the engine, the switch 75 is moved to remove the contacts 76 from the contacts 77 and to engage them in the second set of contacts 78 for the other set of responsive devices (not shown).

If the track electro-magnets are at the center of the track, then a single secondary responsive device at the center of the track will be sufficient for the movement of the vehicle with either end forward, and if a non-magnetic rail section 10 is provided in each rail, then a single primary responsive device will suffice.

Fig. 7 shows a device for automatically reversing the switch 75. The switch 75 is connected to an arm 79' of a band or ring 79'' fitted frictionally on the axle 79$^a$ or other rotating member movable with the wheels of the locomotive, so that the band 79'' is moved in opposite directions when the locomotive is moved forward and backward. When the axle 79$^a$ is rotated in one direction the band 79'' will be moved frictionally with said axle, to move the switch 75 to one position, and when the axle rotates in the opposite direction, the band 79'' and switch 75 are moved to the reverse position, the movement of the parts being limited by suitable stops.

Operation for clear conditions.

When the track is clear ahead, both control magnets 57 and 58 of the controlling station are energized to create magnetic fields in the path of the armature or responsive element 55 of the vehicle equipment. When the primary responsive element or transformer passes from the iron portion of the rail to the non-magnetic section 10, the opening of the magnetic circuit of the primary and secondary windings 39 and 37, between the ends of the core 38, will, through the magnetic impedance in the core 38, materially reduce the flow of current in the circuit 36, whereby the switch 34 is released from the holding magnet 35, thereby opening the circuit of the normally energized solenoid 31. This will let the lever 19 drop, and the magnet 35 remains partially deenergized while the primary responsive element is passing along a non-magnetic rail section. The pawl 42 instantly drops on the wheel 41 and moves downwardly with the toothed edge of said wheel proportionately to the speed and distance of travel of the train, so that by the time the armature 55 enters the magnetic field of the magnet 57, the lever 19 is engaging the contact 74, requiring the lever 19 to move downwardly the proper amount for the closing of the circuit controlled by the armature 55. When the responsive elements are passing the first magnet 57, the lever 19 is reaching the lower end of the contact strip 18, preparatory to leaving said strip, but when the armature 55 is attracted to the magnet 57 so as to move the switch 56 against the contact 69, with the lever 19 engaging the contact 74, the resetting or restoring circuit is closed. Said circuit includes the generator 12, conductor 33, solenoid 31, conductor 68, contact 69, switch 56, conductor 70 and magnets 71, 72 and 73 therein, contact 74, lever 19, spring 20, weight 21, contact 22, conductor 23, contact strip 24, brush 25 and conductor 27. The response of the armature 55 to the energized track magnet will therefore momentarily reenergize the solenoid 31 for lifting the lever 19 to initial position, and the resetting circuit is immediately broken by the movement of the lever 19 away from the contact 74 and also by the release of the armature 55 when leaving the magnet 57. It will be noted that if the lever 19 sticks or moves downwardly too slowly, said lever will not engage the contact 74 at the time the armature 55 passes the magnet 57, so that the resetting or restoring circuit will not be closed, and a sufficiently retarded downward movement of the lever 19 will permit said lever to move away from the contact strips 18 and 30, thus assuring of the proper action of the lever 19 when passing the control station if a clear condition is to be obtained. Also, when passing an energized track magnet so that the armature 55 is attracted to such magnet, the switch 56 being removed from the conductors 81 and 82 will deenergize the magnet 80, but, while the magnet 80 is deenergized, the magnet 71 controlling the same switch 13 is momentarily energized, to hold the switch 13 closed. However, should the switch 56 be removed from the conductors 81 and 82 when the armature 55 is not passing an energized track magnet, with the magnet 71 not energized, the switch 13 will be released to open the circuit of the valve magnet 11 and thus require stopping of the train. This assures of the proper action of the armature or secondary responsive element 55 and the improper movement thereof, either at the wrong time, or by failure to return, will give a danger indication. If this precautionary measure is not desired, the switch 13, magnets 71 and 80, and conductors 81 and 82 are simply eliminated.

The resetting of the lever 19 and immediate release thereof will again start the lever on its downward movement as before, the pawl 42 engaging and moving downwardly with the toothed edge of the wheel 41, and by the time the armature 55 enters the magnetic field of the second track magnet 58, the lever 19 again engages the contact 74, so that the closing of the switch 56 against the contact 59 will again energize the resetting circuit to restore the lever 19 to initial position, as when passing the first magnet 57 of the controlling station. The lever 19 is again released immediately and for the third time starts downwardly, but before the lever passes away from the contact strip 18, the primary responsive element passes from the non-magnetic rail section 10 to the iron portion of the rail, thereby reenergizing the magnet 35 to close the switch 34 and keep the solenoid 31 energized until the next non-magnetic rail section is reached. This will restore the lever 19 and hold it in raised position as when travelling along the magnetic or iron portion of the rail in or through the block.

The track magnets 57 and 58 are preferably spaced equal distances from one another and from the ends of the rail section 10, which is preferably of a standard length, the distances A, B and C being approximately equal, whereby the lever 19 moves from its initial raised position to the contact 74 when the vehicle travels the distance A, B or C. In this way, the lever 19 engages the contact 74 when the secondary responsive element passes the first track magnet 57, and if the lever is reset it will again reach the contact 74 when the secondary responsive element passes the second track magnet 58. If the lever is again reset the primary responsive element will pass from the rail section 10 to the iron portion of the rail before the lever 19 moves from the strip 18, providing the two resets of the lever 19 were obtained.

Thus, with the track magnets both energized and the track circuits unbroken, the responsive action of the secondary responsive element or armature 55 to the track magnets and the coordinated action of the lever 19 will step the vehicle equipment out of a danger condition by the resetting of the lever 19 repeatedly, and the lever will not be permitted to leave the contact strips 18 and 30, thereby keeping the caution magnet 15 and danger magnet 28 energized.

Should the pawl 42 or wheel 41 be broken away or removed, the lever 19, when released, would immediately move downwardly the full amount away from the contact strips 18 and 30 to obtain a danger condition. Also, if the spring 20 is broken, removed, weakened or set the circuit of the magnets 15 and 28 would be opened to obtain a danger condition, and such condition would also be obtained should the governor 26 fail to rotate when the lever 47 is advanced for the movement of the vehicle, inasmuch as the brush 25 would move downwardly away from the contact strip 24 to open the normal running circuit. The circuit is not broken between the strip 24 and brush 25, however, when making an intentional stop with the lever 47 in initial position to shut off the power and to bridge the gap between the strip 24 and brush 25. Should the lever 47 be moved to start the vehicle, with the governor at rest, the circuit would be broken between the brush 25 and strip 24 and also between the conductors 45 and 46, to give a danger indication or produce a danger condition, but the train could proceed at a slow speed.

*Danger conditions.*

When danger conditions exist, either by the deenergization of the magnets 57 and 58 by the intentional opening of the switches 64 and 65, or by the failure of the track battery or circuits, the track magnets 57 and 58 are dead or deenergized so that they cannot attract the armature or responsive element 55. Therefore, when the lever 19 is released by the movement of the primary responsive element along the non-magnetic rail section 10, such lever continues to move on down without interruption, the solenoid 31 remaining deenergized. By the time the responsive elements have moved substantially midway between the track magnets 57 and 58, the lever 19 has moved half way down and leaves the contact strip 18, the first magnet 57 having been given an opportunity for restoring the run-down device. The lever 19 moving away from the strip 18 will open the circuit of the caution magnet 15 to let the switch 16 drop open, and, at the same time, the pawl 42 reaches the position where it leaves the wheel 41, thereby releasing the lever 19 for unrestricted downward movement away from the strip 30. This will open the circuit of the danger magnet 28. This action will occur whenever the armature 55 is not attracted to the first track magnet 57, thereby obtaining a danger condition at once and before the responsive elements pass the second track magnet 58, so that the first track magnet 57 must be energized for either caution or clear conditions. However, under danger conditions, with both magnets 57 and 58 deenergized, the lever 19 has plenty of opportunity to move downwardly away from the strip 30, because of the length of the rail section 10, the solenoid 31 remaining deenergized for a sufficient interval of time to let the lever 19 be removed from said contact strip 30, without fail.

The danger magnet 28 being deenergized will let the switch 14 drop open, and even though the lever 19 is again restored when the primary responsive element passes to the iron portion of the rail, the switch 14 remains open, being out of the magnetic field of the magnet 28, or at least a sufficient distance away from the magnet 28 so as not to be picked up by the magnet 28 itself. The switch 14 therefore remains open, to open the circuit of the valve magnet 11, and the train must be brought to a stop because of the application of the brakes under such conditions.

When the train is brought to a stop, the brush 25 engages the contact 54, thereby closing a circuit including the generator 12, valve magnet 11, conductor 50, magnet 53, switch 52, contact 54, brush 25 and conductor 27, so that the brakes are released when the train has come to a stand still. The magnet 53 being energized will raise the switch 52 and connect it with the danger contact strip 51, so that the circuit through the magnets 11 and 53 is now closed by way of the strip 51. This enables the train to proceed under a slow speed, which may be desirable or necessary under different traffic conditions, but if the speed permitted under danger control is exceeded, the brush 25 is raised away from the strip 51, thereby opening such circuit and applying the brakes. The switch 52 is also dropped away from connection with the strip 51, thereby again requiring the train to be brought to a stop before it can proceed. The engineer or operator must therefore obey the speed control under danger conditions or the train will be stopped each time the maximum danger speed is exceeded. The vehicle equipment having been set in this danger condition cannot be cleared without the action of the armature 55 and lever 19 in passing an energized track magnet 57. The danger condition is therefore continued through the block and into the next block unless a clearing action is obtained when passing a controlling station.

Supposing the train to be proceeding under danger control, when it passes a control station with the track magnet 57 energized, the armature 55 being attracted to said magnet 57 and the lever 19 engaging the contact 74, as hereinbefore described, will energize the resetting circuit, and the magnets 72 and 73 in said circuit will be energized to raise the switches 14 and 16, so that said switches will be held closed by the respective magnets 28 and 15, the switch 14 when open being sufficiently out of the influence of the magnet 28 to remain open until picked up by the magnet 72. This will clear the vehicle equipment, providing the apparatus is in operative condition when the magnet 57 is passed. If the magnet 57 is deenergized, as for a danger condition, the danger control of the vehicle is maintained even without anything else occurring, although the danger control is repeated by the downward movement of the lever 19. Therefore, to restore either the caution switch 16 or the danger switch 14, the resetting circuit must be energized, the failure of which will leave the vehicle equipment under the speed control when passing a control station and entering the next block.

A danger condition is also established by failure of current, breaking or shorting of circuits, failure of the spring 20, governor 26 and other elements of the apparatus, so that failures are on the side of safety.

*Caution conditions.*

When the train should proceed under caution speed control through a block, the first track magnet 57 is energized and the second track magnet 58 is deenergized. The lever 19 is therefore reset when the armature 55 passes and is attracted to the magnet 57, said lever 19 having been released with the primary responsive element moving along the non-magnetic rail section. When the armature 55 leaves the magnet 57, the lever 19 is again released and moved downwardly with the wheel 41, the responsive devices having the distances B and C to move when the lever starts downwardly a second time. The armature 55 passes the second magnet 58, which is deenergized, without being attracted to said magnet, and when the armature 55 has moved past said magnet 58, about half way between said magnet and the corresponding end of the rail section 10, the lever 19 is moved downwardly sufficiently to be removed from the strip 18, so as to open the circuit of the magnet 15, although the wheel 41 does not permit the lever 19 to drop away from the strip 30 before the primary responsive element is again returned to the iron portion of the rail so as to again energize the solenoid 31 and return the lever 19 to normal position. In other words, although the lever 19 is permitted to move downwardly sufficiently, when the armature 55 has passed the magnet 58 without a responsive action, so as to open the circuit of the magnet 15 and permit the switch 16 to open, the downward movement of the lever 19 is not sufficient to release said lever 19 from the wheel 41, thereby retaining the lever 19 in engagement with the strip 30, to keep the danger magnet 28 energized. The primary responsive element, under caution conditions, therefore returns to the iron portion of the rail beyond the rail section 10 before the lever 19 is removed from the wheel 41 and strip 30, thereby avoiding a danger condition, although a caution condition has been established.

The switch 16 will remain down through the block, thereby enforcing caution speed control. The caution speed control circuit includes the generator 12, conductor 33, magnet 11, switches 13 and 14, conductor 48, caution contact strip 49, brush 25, and conductor 27. The train must therefore proceed under caution speed or the brush 25 will be raised away from the strip 49, to open the circuit of the magnet 11 and apply the brakes.

A caution speed control is maintained through the block or through a number of blocks, until the resetting circuit is energized, when passing a control station, with the first magnet 57 energized to attract the armature 55. The clearing action is the same as under danger conditions. Thus, when the armature 55 is attracted to the magnet 57 and the lever 19 engages the contact 74, to close the resetting circuit, the magnet 73 will be energized to pick up the switch 16 for clearing the vehicle equipment, said switch being held closed by the magnet 15 whose circuit is again closed. The response of the armature 55 to a track magnet and the proper positioning of the lever 19 to engage the contact 74 are necessary to obtain the clearing action. If both magnets 57 and 58 are deenergized when passing them under caution control, the danger condition is established.

*Passing non-magnetic crossings, etc.*

The vehicle equipment can pass non-magnetic crossings, switch points, frogs, and short rail sections, which are less than half the length of the rail section 10 in length, without a danger or caution condition being established in the vehicle equipment which, if such condition were produced, would be objectionable because of the unnecessary stops or retarded movements of the train. It is the practice to use manganese bronze at crossings, switch points, frogs, and elsewhere to withstand wear, and the vehicle equipment will take care of itself when such non-magnetic portions are of a length less than one-half the length of the non-magnetic rail sections 10. When the primary responsive element passes a short non-magnetic portion in the rail, the magnet 35 is deenergized, and also the solenoid 31, so that the lever 19 moves downwardly, but the train must move a distance of substantially one-half of the length of the rail section 10 before the lever 19 is removed from the contact strip 18. Consequently, before the lever 19 is released from the wheel 41 or removed from the strip 18, the primary responsive element again reaches an iron or magnetic portion of the rail, to restore the lever 19 by the reenergization of the magnet 35 and solenoid 31. In this way, any non-magnetic portions in the rail which are shorter than one-half the length of the rail section 10, will not affect the apparatus objectionably.

If there are longer portions or sections of non-magnetic material in the rail, the intermittent resetting of the lever 19 can be obtained by associating with or attaching to the non-magnetic sections or portions at intervals, iron armatures or pieces past which the primary responsive device moves, for reenergizing the magnet 35 and restoring the lever 19 to keep said lever from moving away from the strips 18 and 30. It is also possible to have iron bars disposed along the inner sides of the non-magnetic portions of the rail for the cooperation of the primary responsive device to keep the magnet 35 and solenoid 31 energized, the same as when moving along an iron or magnetic portion of the rail.

*Stop eliminating device for long non-magnetic rail sections.*

In Fig. 6 there is shown means for eliminating the stopping or retarding of the vehicle when there is a long section of non-magnetic rail in the track, either in the protected portion or along unprotected territory, without requiring the use of armatures, iron bars or other means along the non-magnetic rail section for intermittently or continually influencing the primary responsive element to reset or hold the lever 19.

The stop elimination is obtained by the provision of a permanent or electro-magnet 101 disposed at the center of the track or some other suitable position a distance from the end of the long non-magnetic rail section 100, for attracting an armature 102 or other responsive device carried by a lever or switch 103 supported from the vehicle, for the attraction of the armature or the response thereof to the magnet when the vehicle is entering the non-magnetic track section, such as would ordinarily produce a danger condition in the absence of the closing of the resetting circuit, there being no magnets present at this point of the track for influencing the secondary responsive device.

The switch 103, when the armature 102 is attracted toward the magnet 101, is brought into connection with branch or shunt conductors 17ˣ and 29ˣ connected to the conductors 17 and 29, respectively, whereby the contact strips 18 and 30 and lever 19 can be shunted while the vehicle is moving along the rail section 100. A conductor 104 connects the switch 103 with a contact strip 106 that is engaged by the lever 19 when same has moved half way down or further, as seen in Fig. 6, so that when the lever 19 is down sufficiently and the switch 103 is moved into engagement with the conductors 17ˣ and 29ˣ, the current from the caution magnet 15 and danger magnet 28 can flow through the conductors 17ˣ and 29ˣ, resepctively, switch 103, conductor 104, solenoid 105 and contact strip 106 to the lever 19, even though the lever 19 is removed from the strips 18 and 30 by the deenergization of the solenoid 31.

An electro-magnet 105 is disposed in the conductor 104 to attract and hold the second armature 113 carried by the switch 103, the armature 102 being the only one to be attracted by the magnet 101, and the magnet 105 being energized will hold the switch 103 in electrical connection with the conductors 17ˣ and 29ˣ.

When the primary responsive element moves along the rail section 100, and the armature 102 passes over the magnet 101 to be attracted thereto, the switch 103 is moved into connection with the conductors 17ˣ and 29ˣ, and the armature 113 being attracted by the magnet 105, the lever 19 having moved down into engagement with the strip 106, will shunt the contact strips 18 and 30, so that the lever 19 can move completely down without deenergizing the caution or danger magnets 15 and 28. However, as soon as the primary responsive element is returned to an iron or magnetic portion of the rail, the magnet 35 being reenergized will attract the switch 34 and close the circuit of the solenoid 31, so that the lever 19 is restored to initial position. The lever 19 being removed from the strip 106 will open the circuit of the magnet 105 and release the armature 113, so that the switch 103 will be released and will return to normal position, thereby opening the shunts through the conductors 17ˣ and 29ˣ and restoring the control as before. One of the magnets 101 can therefore be provided near the entrance end of each long non-magnetic portion of track to prevent the train being stopped while moving along such portion of the track, but the normal control is restored as soon as the train moves out of the non-magnetic track section.

To assure of the solenoid 31 being reenergized when the primary responsive element moves from a non-magnetic to a magnetic portion of the rail, a safety magnet 108 is provided controlling a switch 114 in the conductor 27, whereby when the magnet 108 is completely deenergized, the circuit of the magnet 11 is opened for stopping the train. The magnet 108 is connected in parallel with the magnet 35, and the magnet 35 releases its switch 34 when the current is reduced by the movement of the core 39 from an iron to a non-magnetic portion of the rail, but the switch 114 is not released from the magnet 108 unless the current is reduced still more or cut off by the failure of the generator 40, the breaking or shorting of the circuit, or other accident. A conductor 107 is connected to one terminal of the magnet 35, and a conductor 109 connects the other terminal of the magnet 35 with one terminal of the magnet 108. A conductor 110 is connected to the other terminal of the magnet 108, and the conductors 107 and 110 are connected to contacts 111 normally engaged and bridged by the switch 103. The magnet 108 is therefore energized whenever the magnet 35 is energized, and should the current fail for one reason or another, the magnet 108 would be deenergized to release the switch 114. A pair of contacts 112 is connected to the conductors 107 and 110 to be bridged by the switch 34 when the magnet 35 is deenergized, due to the movement of the primary responsive element along a non-magnetic section of rail.

Therefore, when the switch 103 is moved by the magnet 101 and held by the magnet 105, the circuit of the magnet 108 through the switch 103 is opened, but, the switch 34 having been released from the magnet 35 will shunt the switch 103, the switches 103 and 34 being in parallel, to keep the magnet 108 energized even though the current is reduced somewhat. The magnet 108 has a dropaway characteristic of sufficient duration to prevent the switch 114 from opening during the interval that the switch 103 is removed from the contacts 111 and the switch 34 engages the contacts 112, or during the interval that the switch 34 is removed from the contacts 112 and switch 103 engages the contacts 111. In other words, the magnet 108 is sufficiently slow-acting when being deenergized to hold the switch 114 closed for an interval sufficiently long to permit one of the switches 34 and 103 to close the circuit of said magnet while the other switch is opened.

Should the current fail, under the circumstances, the magnet 108 will release the switch 114, so that the magnet 35 must be supplied with current to keep the switch 114 closed, although the current is of reduced potential due to the movement of the core 38 along the non-magnetic rail section. This assures of current being supplied to the magnets 35 and 108 or the establishment of danger conditions, so that when the core 38 moves along an iron or magnetic portion of the rail with the magnet 35 energized, the switch 34 will be raised to close the circuit of the solenoid 31. If the circuit of the solenoid 31 has been broken or crossed in the meantime, then the lever 19 will not be restored, and the switch 34 having been removed from the contacts 112, will open the circuit of the magnet 108 to stop the train. The lever 19 must therefore be restored to break the circuit of the magnet 105 and release the switch 103 so that it bridges the contacts 111, when the switch 34 is attracted by the reenergized magnet 35 in moving from a non-magnetic to a magnetic portion of the rail.

The apparatus will take care of itself as long as the primary responsive element moves along an iron or magnetic portion of the rail, and the stop eliminating arrangement will only be put into action when the armature 102 passes over the special magnet 101 provided on the track, normal conditions being restored as soon as the non-magnetic rail section has been passed.

*Isolated rail section control elements.*

The modification illustrated in Fig. 2 uses the non-magnetic rail section 10 at each controlling station to bring the run-down device into operation, and in lieu of the track electro-magnets or inductors of the first form of apparatus utilizes isolated rail sections 57$^a$ and 58$^a$ at the control station. Such isolated rail sections are about two feet in length and are insulated from the other portions of the rail. As shown, the isolated sections are in one rail while the non-magnetic rail section is in the other rail of the track, although the isolated sections, if of non-magnetic material, can be used in the non-magnetic section 10. The longitudinal spacing of the isolated rail sections 57$^a$ and 58$^a$ with reference to the non-magnetic rail section 10 is the same as with the electro-magnets 57 and 58, distances A, B and C being substantially the same as in the first form of apparatus.

The track part of the apparatus includes partial track circuits 61$^a$ and 62$^a$ connected at corresponding ends with the isolated rail sections 57$^a$ and 58$^a$, respectively and connected at their opposite ends with the other portions of the rail, both of said circuits including the track battery 63. Said circuits include the respective switches 64 and 65 which are held closed by the corresponding signal electro-magnets 66 and 67, when said magnets are energized. The circuits 61$^a$ and 62$^a$ are dead when the switches are opened, or when the battery or circuits fail, and the vehicle equipment must receive electrical energy from the track battery 63 in order to step out of a danger condition by the resetting of the lever 19, the same as in the first form of apparatus excepting for the cooperating elements of the vehicle and track. The vehicle equipment is substantially the same as in the first form, with a few exceptions, as presently described. The same primary responsive element is used as in the first form of apparatus, for deenergizing the magnet 35 and solenoid 31 when the primary responsive element passes a non-magnetic rail section, so that the lever 19 moves downwardly.

The resetting circuit is somewhat different from that in the first form of apparatus, because of the use of the isolated rail sections for obtaining clear or caution conditions by stepping out of a danger condition, instead of the inductive elements. Such resetting circuit in the vehicle equipment is only a partial circuit, requiring completion by the partial track circuit and only obtaining energy from the track battery. The resetting circuit includes the solenoid 31, conductor 68, a wheel or truck 69' of the vehicle or train to which the conductor 68 is connected in this form of apparatus, the corresponding rail of the track, partial track circuit 61$^a$ including the battery 63 with the switch 64 closed, isolated rail section 57$^a$, a contact shoe 55$^a$ when passing over the isolated rail section 57$^a$ in contact therewith, conductor 70' (corresponding to conductor 70 in the first form), the contacts 74 bridged by a switch 74'' carried by the lever 19, and conductor 70'' connected to the solenoid 31. The switch 74'' engages the contacts 74' in the same position as when the lever 19 in the first form engages the contact 74. Therefore, if the switch 64 of the track circuit 61 is closed by the energized magnet 66, and the shoe 55$^a$ bears on the isolated rail section 57$^a$ with the switch 74'' bridging the contacts 74', the resetting circuit of the vehicle equipment is closed by way of the partial track circuit 61$^a$ and the solenoid 31 will be energized from the track battery 63 to reset the lever 19. The resetting circuit is opened as soon as the shoe 55$^a$ leaves the rail section 57$^a$, but the lever 19 can be reset a second time, in clear conditions, when the shoe 55$^a$ bears on the rail section 58$^a$ with the switch 65 closed and the switch 74'' bridging the contacts 74'.

In the arrangement as shown, the shoe 55$^a$ is normally raised from the rail so as only to have a frictional sliding contact with the rail when passing the non-magnetic rail sections. Thus, the shoe 55$^a$ is supported by a spring-raised piston 83 working in a cylinder 84 to which an air or fluid pressure pipe 85 is connected. A valve 86 in said pipe normally shuts off the flow of pressure fluid from the cylinder so that the spring raises the shoe 55$^a$ and piston 83.

The weakening or breaking of the spring will do no harm even if the shoe is let down on the rail, excepting the wear on the shoe, and the normally raised shoe is used simply for the purpose of saving wear on the shoe when not passing control stations. An armature lever 87 is connected to the valve 86 to be attracted by a valve-opening electro-magnet 88 disposed in the circuit 89 with the conductors 27 and 33 leading to the generator 12. A switch 90 for the circuit 89 is carried by the switch 34, to normally open the circuit 89 when the magnet 35 is energized, but when the magnet 35 is deenergized in passing a non-magnetic rail section, the switch 90 closes the circuit 89 and energizes the magnet 88 from the generator 12, to raise the armature lever 87 and open the valve 86. Pressure fluid will then flow into the cylinder 84 to depress the piston 83 and force the shoe 55$^a$ under pressure against the rail to assure of a good contact with the isolated rail sections 57$^a$ and 58$^a$. However, if the switches 64 and 65 are open, or the track circuits or battery fail, the resetting circuit of the vehicle equipment cannot be energized for resetting the lever 19.

Danger, caution and clear conditions are established in substantially the same manner as in the first form of apparatus, but the solenoid 31 must be energized from the track battery for the resetting operation to step out of a danger condition into either a caution or a clear condition. When the primary responsive element returns to the iron portion of the rail, the magnet 35 being reenergized will close the switch 34 and open the switch 90, and the solenoid 31 is reenergized for returning and holding the lever 19. The magnet 88 being deenergized will release the armature lever 87 to close the valve 86 so that the shoe 55$^a$ will be raised from the rail. The valve 86 may be an ordinary three-way valve whereby when the armature lever 87 moves downwardly, the air is shut off from the cylinder 84 and said cylinder is connected to the atmosphere to permit air to escape therefrom, whereas when the lever 87 is raised, the air escape port is closed and the cylinder is connected with the supply of compressed air.

This type of apparatus will not waste the energy of the battery 63, inasmuch as the track circuits 61$^a$ and 62$^a$, although the switches 64 and 65 are closed, will not be completed excepting when a train is passing the controlling station. If the insulation of the isolated rail section 57 and 58 should break down, then the track circuits would be closed across the insulation, and the resetting circuit of the vehicle would not receive current from the track battery, creating a danger condition. The same would be true if the insulation between the shoe 55$^a$ and truck or wheel 69 should break down, because the resetting circuit would then not receive current from the track battery.

*Combination non-magnetic rail section and ramp control elements.*

Fig. 3 illustrates the use of a ramp 91 in place of the inductive track elements of the first form and the isolated rail sections of the second form of apparatus, in connection with the non-magnetic rail section 10.

The vehicle equipment is substantially the same as in the first form of apparatus, but the magnets 71 and 80, switch 13 and conductors 81 and 82 are eliminated, and the conductor 68 is connected to a wheel or truck 69' of the vehicle or train, as in the second form of apparatus, while the conductor 70 is connected to a shoe 55' that slides over the ramp 91 for completing the resetting circuit through the ramp.

The ramp 91 is insulated or of insulating material, and is provided with the contact plates or bars 57$^b$ and 58$^b$ spaced apart the distance B from one another and spaced the distances A and C, respectively, from the ends of the non-magnetic rail section. Said plates 57$^b$ and 58$^b$ are connected by the bridges 61$^b$ and 62$^b$ with the rail, and such bridges include the respective bridging switches 64 and 65 controlled by the signal circuit magnets 66 and 67. The bridges are opened when the switches are opened or should the wires be broken. Therefore, with the switches 64 and 65 open or the track circuits broken, or should the shoe 55' be broken off or removed, or should the shoe fail to slide properly on the ramp, when passing a control station, the vehicle equipment would go to danger position by the action of the run-down device, due to the inductive interruption between the primary responsive element and the rail, caused by the presence of the non-magnetic rail section 10. However, if the switch 64 is closed and the bridge 61$^b$ completed between the plate 57$^b$ and the rail, the shoe 51' in sliding on the plate 57$^a$ will complete the resetting circuit between the shoe 55' and wheel 69' by way of the bridge 61$^b$, so that the train equipment can be reset, the bridge 61$^b$ closing the circuit of the resetting devices between the shoe 55' and conductor 68 the same as resetting circuit of the first form of apparatus is closed by the movement of the switch 56 against the contact 69. If both switches 64 and 65 are closed, the vehicle equipment can be stepped out of danger condition into a clear condition, but if the switch 65 is open and the switch 64 closed, the vehicle equipment will go to caution condition, whereas if both switches 64 and 65 are open, and the bridges 61$^b$ and 62$^b$ broken, the vehicle equipment will not be reset while passing a non-magnetic rail section, thereby obtaining a danger condition.

This condition is also obtained should the ramp be removed or displaced, the shoe 55' removed or displaced, or other failure occur to prevent the resetting device from being operated. This type of apparatus requires no current on the track for the bridges or partial track circuits 61$^b$ and 62$^b$, and the apparatus will produce a danger condition even though the ramp or the shoe is removed, displaced or insulated by ice, sleet or snow, the non-magnetic rail section assuring of a danger condition when the resetting device fails to operate.

Exclusive ramp control.

Fig. 4 illustrates the use of a ramp, without the non-magnetic rail section, for bringing the run-down device into operation, as well as controlling the resetting device. Although the apparatus is simplified somewhat, it does not have the danger precaution as obtained by the non-magnetic rail section, which when used, is ever present to obtain a danger condition unless the resetting devices are operable.

The ramp 91', as shown, is of substantially the same length as the non-magnetic rail section of the other forms of apparatus, and has the contact plates or bars 57$^b$ and 58$^b$ therein, as in Fig. 3, with the bridges 61$^b$ and 62$^b$ and bridging switches 64 and 65 the same as in Fig. 3. It will be noted that no track battery is necessary for the bridges or partial track circuits 61$^b$ and 62$^b$, nor is polarized current or a polarized relay necessary for obtaining danger, caution and clear conditions. The plates 57$^b$ and 58$^b$ are spaced the distance B apart, and are spaced distances A and C, respectively, from the ends of the ramp.

The resetting circuit of the vehicle equipment is completed in the same manner as in the third form, requiring the track bridge or partial circuit to be closed. Thus, with the shoe 55' bearing on the plate 57$^b$ and the switch 64 closed, the resetting circuit includes the generator 12, conductor 33, solenoid 31, conductor 68' connecting the solenoid with the wheel or truck 69', corresponding rail of the track, bridge or partial circuit 61$^b$, plate 57$^b$, shoe 55', conductor 70, contact 74, lever 19 and other connections (as in Fig. 1) to the conductor 27. Therefore, with the shoe 55' bearing on the plate 57$^b$ and the switch 64 closed, the lever 19 being in engagement with the contact 74, the resetting circuit is closed to energize the solenoid 31 and reset the lever 19. A second resetting of the lever is obtainable when the shoe 55' passes over the plate 58$^b$ with the switch 65 closed.

In this variation, the primary responsive device of the first three forms of apparati is substituted by a switch 34' connecting the solenoid 31 with the conductor 27 to complete the circuit of the solenoid with the generator 12, no alternating current being used. The switch 34' is carried by the shoe 55', so that when the shoe moves onto the ramp 91', the switch 34' is opened, thereby deenergizing the solenoid 31 and letting the lever 19 move down for obtaining a danger condition, unless said lever is reset. The lever 19 engages the contact 74 at the time the shoe moves over the plate 57$^b$, and if the lever has been reset it will again engage the contact 74 when the shoe 55' moves over the second plate 58$^b$.

The primary action is the opening of the switch 34' when the shoe moves on the ramp, to deenergize the solenoid 31 and permit the run-down lever or member 19 to operate, and a danger condition is brought about unless the resetting circuit is closed through the lever 19 and track elements. The operation of the vehicle equipment is otherwise substantially the same as in the first form of apparatus.

Selective resetting apparatus.

Fig. 5 illustrates another modified form of apparatus by means of which there is only a single resetting action for either caution or clear conditions, instead of the repeated resetting operation as in the forms of apparati hereinbefore described. In other words, the lever 19 is only reset once, when passing a controlling station, for obtaining either caution or clear conditions, and, to accomplish such result, the responsive elements are duplicated at opposite sides and other changes made accordingly.

A non-magnetic rail section 10 is interposed in each rail of the track at the controlling station, and the caution electro-magnet 58 is associated with one rail section 10 while the clear electro-magnet 57 is associated with the other rail section 10. Said magnets are located at opposite sides of the track and may be fastened to the outer sides of the rail sections, while the primary responsive elements (one at each side) move along the inner sides of the rails. However, the primary responsive elements may be directly over the rails if the magnets 57 and 58 are spaced from the rails or otherwise arranged so as not to interfere with said primary responsive elements.

The track circuits 61 and 62 of the magnets 57 and 58, respectively, are substantially the same as in the first form of apparatus, and have the corresponding switches 64 and 65 therein controlled by the signal magnets 66 and 67. The magnet 57 is energized for clear conditions and the magnet 58 is energized for caution conditions, by the closing of the corresponding switches 64 and 65.

Two primary responsive elements are used, the primary windings 39 thereof being energized by the alternating current generator 40, with said windings in multiple or parallel. The secondary windings or coils 37 are connected in separate circuits 36 with the alternating current holding magnets 35 controlling switches 34 connected in series in the normal circuit of the solenoid 31. It will be evident that the primary responsive elements and the magnets and switches controlled thereby are merely duplicated, the opening of either switch 34 opening the circuit of the solenoid 31 to release the lever 19. This gives a double assurance of the solenoid 31 being deenergized when the primary responsive elements pass a controlling station, and the reversal of the engine or locomotive will not alter the operative relation of the primary responsive elements with the rails.

An armature or secondary responsive element 55 is provided at each side of the vehicle to pass the track magnets 57 and 58 simultaneously, and said armatures are carried by levers or switches 56. The conductor 68$^x$ leading from the solenoid 31 is connected to both switches 56, so that either switch 56 when moved by the attraction of the corresponding armature 55 toward an energized track magnet, will connect the conductor 68$^x$ with the conductor 70$^x$ leading through the magnets 71 and 72 to the contact 74, the same as in the first form of apparatus, excepting the magnet 73, which is not connected in series with the magnets 71 and 72. The switches 56 are therefore disposed in parallel between the conductors 68$^x$ and 70$^x$, whereby either armature 55 in responding to an energized track magnet will close the resetting circuit for resetting the lever 19 before the lever is removed from the single contact strip 18.

In the arrangement as shown in Fig. 5, the conductor 29 leading from the danger magnet 28 is connected to the contact strip 18, and the conductor 17′ leading from the caution switch 16 is connected through a reversing switch 75′ with the switch 56 at the caution side, and is connected through such switch 56 and reversing switch 75′ with the conductor 29 and strip 18. When the vehicle or locomotive is reversed end for end to travel in the same direction on the track, the reversing lever 79 being operated will reverse the switch 75′, thereby changing the connection of the conductor 17′ through the other switch 56, whereby in the movement of the locomotive or engine with either end forward, the caution control will be by way of the switch 56 at the proper side of the track.

The circuits of the danger magnet 28 and caution magnet 15, however, are both completed through the strip 18, and if the lever 19 is permitted to move down without being reset in passing the track magnets 57 and 58, a danger condition will be established, but if either armature 55 is attracted to the corresponding track magnet, the lever 19 is reset to avoid the circuit of the danger magnet being opened. Then, after leaving the track magnets, even though the lever 19 starts downwardly again, the primary responsive elements reach the iron portions of the rails to reclose the switches 34 and again energize the solenoid 31. If the resetting is done by the caution magnet 58, the corresponding switch 56 being moved, will open the circuit of the magnet 15 through the conductor 17′, thereby releasing the switch 16, and putting on the caution speed control through the conductor 48 and caution contact strip 49, at the same time that the lever 19 is reset to prevent a danger condition being established.

With this arrangement, if the track magnets 57 and 58 are both deenergized, the lever 19 will move downwardly away from the strip 18, to produce a danger condition. If the magnet 57 is energized, the lever 19 is reset to keep the vehicle equipment in clear running condition. If the magnet 58 is energized the vehicle equipment is reset, the same as for a clear condition, but the circuit of the caution magnet 15 is opened to establish a caution condition immediately when the lever 19 is reset. Thus, with a single resetting operation, the caution or clear conditions are established selectively according to deenergization of the track magnets 57 and 58. This eliminates a double resetting action, as in the first form of apparatus, for obtaining a clear condition.

In this type of apparatus, the conductors 81 and 82 of the magnet 80 are connected by switches 56$^x$ in series, and said switches are carried by the switches 56, so that either armature 55 being attracted toward a track magnet will open the circuit of the magnet 80, but if the resetting circuit is closed at the same time, the magnet 71 being energized will keep the switch 13 from opening.

In this arrangement it is also necessary to prevent the magnet 73 from being energized when the armature 55 at the caution side is attracted toward the caution track magnet, for otherwise the switch 16 would not drop. The magnet 73 is therefore not connected in series with the magnets 71 and 72, and only one terminal of the magnet 73 is connected to the conductor 70$^x$ and the other terminal is connected to a conductor 70$^y$ which leads through the reversing switch 75′ to be engaged by the switch 56 at the clear side. The switch 75′ reverses the connections so that the switch 56 at the clear side only will make connection through the conductor 70$^y$ with the magnet 73. Consequently, when the armature 55 at the caution side is attracted by the magnet 58, to close the resetting circuit, the magnet 73 is not energized, so that the breaking of the circuit through the conductor 17' will deenergize the magnet 15 to let the switch 16 drop for producing a caution condition. However, when the armature 55 at the opposite side responds to an energized clear magnet 57, not only are the magnets 71 and 72 energized, but the corresponding switch 56 engages the conductor 70ʸ to connect the magnet 73 in the resetting circuit, in parallel with the magnets 71 and 72, so as to restore the switch 16. Said switch 16 is only restored when a clear signal or indication is received by the vehicle equipment, to preserve a caution condition unless a clear condition prevails. The reversing switch 75' reverses the connections of the conductors 17' and 70ʸ with the switches 56 when the direction of travel of the locomotive or engine is reversed, to preserve the clear and caution control with the engine running with either end forward.

Having thus described the invention, what is claimed as new is:—

1. Vehicle controlling apparatus including a run-down device on the vehicle for obtaining an ultimate condition, means for normally restraining the operation of said device and releasing said device when passing a control station of the track, and means for resetting said device when passing the station to avoid such condition, and operable one or more times to obtain other vehicle conditions in succession.

2. Vehicle controlling apparatus including control stations at desired points of the vehicle track each including control elements, a run-down device on the vehicle operable at a speed according to the speed of the vehicle for obtaining an ultimate vehicle condition when the vehicle has travelled a predetermined distance, means for normally restraining the operation of said device and controlled by a control element when passing a control station for releasing said device, and means controlled by another control element for resetting said device during such distance of movement of the vehicle to avoid such condition.

3. Vehicle controlling apparatus including control stations at desired points of the vehicle track each including control elements, a run-down device on the vehicle for obtaining an ultimate vehicle condition, means for normally restraining the operation of said device and controlled by a control element when passing a control station for releasing said device, and means controlled by other control elements when passing the station for resetting said device to avoid such condition and operable for selectively establishing other vehicle conditions.

4. Vehicle controlling apparatus including control stations at desired points of the vehicle track each including control elements, a run-down device on the vehicle for obtaining an ultimate vehicle condition, means for normally restraining the operation of said device and controlled by a control element when passing a control station for releasing said device, and means controlled by other control elements at the station for resetting said device to avoid such condition and operable one or more times for establishing other vehicle conditions in succession.

5. Vehicle controlling apparatus including control stations at desired points of the vehicle track each including a non-magnetic rail section in the track, normally inactive vehicle carried means operable by a run-down motion at a speed according to the vehicle to obtain a predetermined vehicle condition when the vehicle has travelled the predetermined distance, and rendered active when passing a non-magnetic rail section, control elements associated with said rail section of each control station, and means responsive to said control means during such distance of movement of the vehicle, when the first named means is in operation, to avoid such condition.

6. Vehicle controlling apparatus including control stations at desired points of the vehicle track each including a non-magnetic rail section in the track, normally inactive vehicle controlling means operable, when passing said rail section, to obtain a predetermined vehicle condition, control elements associated with said rail section, and means responsive to said control elements to avoid such condition and operable one or more times for establishing other vehicle conditions in succession.

7. Vehicle controlling apparatus including control stations at desired points of the vehicle track each including a non-magnetic section in the track, normally inactive vehicle carried means operable by a run-down motion at a speed according to the vehicle speed, when passing said sections, to obtain a predetermined vehicle condition when the vehicle has travelled a predetermined distance, control elements associated with said non-magnetic section at each control station, and means controlled by said control elements during such distance of movement of the vehicle to avoid such condition and operable for obtaining other vehicle conditions selectively.

8. Vehicle controlling apparatus including control stations at desired points of the vehicle track each including a non-magnetic section in the vehicle track, vehicle carried means operable by a run-down motion at a speed according to the speed of the vehicle to obtain a predetermined vehicle condition when the vehicle has travelled a predetermined distance, means for restraining the operation of said means and having a responsive relation with the track to release the firstnamed means when passing the non-magnetic section of a control station, controlling means associated with said non-magnetic section at each station, and means controlled by said controlling means during such distance of movement of the vehicle to avoid such condition.

9. Vehicle controlling apparatus including control stations at desired points of the track each including a non-magnetic section in the track, vehicle carried means operable by a run-down motion at a speed according to the vehicle speed to obtain a predetermined vehicle condition when the vehicle has travelled a predetermined distance, means for restraining the operation of said means and having a responsive relation with the track to release the first named means when passing a non-magnetic section, controlling means associated with said non-magnetic section of each station, and means controlled by said controlling means during such distance of movement of the vehicle to avoid such condition and operable for obtaining other vehicle conditions selectively according to the condition of said controlling means.

10. Vehicle controlling apparatus including control stations at desired points of the vehicle track each including a non-magnetic section in the track, vehicle carried means operable to obtain a predetermined vehicle condition, means for restraining the operation of said means and in responsive relation with the track for releasing the firstnamed means for operation when passing the non-magnetic section, control elements associated with said non-magnetic section, and means controlled by said control elements for avoiding such vehicle condition and operable one or more times according to the condition of said control elements, for obtaining other vehicle conditions in succession.

11. Vehicle controlling apparatus including control stations at desired points of the vehicle track each including a non-magnetic section in the track, vehicle carried means in responsive relation with the track operable by a run-down motion at a speed according to the vehicle speed for obtaining a predetermined vehicle condition when the vehicle has travelled a predetermined distance when passing the non-magnetic section, and means operable during such distance of movement of the vehicle when passing said non-magnetic section to avoid such condition and obtain other vehicle conditions selectively.

12. Vehicle controlling apparatus including control stations at desired points of the vehicle track each including a non-magnetic section in the track, vehicle carried means in responsive relation with the track for obtaining a predetermined vehicle condition when passing the non-magnetic section, and means operable when passing the non-magnetic section to avoid such condition and operable one or more times to obtain other vehicle conditions in succession.

13. Vehicle controlling apparatus including control stations at desired points of the vehicle track each including a non-magnetic section in the track, a run-down device on the vehicle for obtaining an ultimate vehicle condition, means for normally restraining the operation of said device and for releasing said device when passing a non-magnetic section, controlling means associated with said non-magnetic section, and means controlled by said controlling means for resetting said device.

14. Vehicle controlling apparatus including control stations at desired points of the vehicle track each including a non-magnetic section in the track, a run-down device on the vehicle for obtaining an ultimate vehicle condition, means for normally restraining the operation of said device, and in responsive relation with the track for releasing said device when passing the non-magnetic section, control elements associated with said non-magnetic section, and means controlled by said control elements for resetting said device to avoid such condition and operable for obtaining other vehicle conditions selectively.

15. Vehicle controlling apparatus including control stations at desired points of the vehicle track each including a non-magnetic section in the track, a run-down device on the vehicle for obtaining an ultimate vehicle condition, means for normally restraining the operation of said device and in responsive relation with the track for releasing said device when passing the non-magnetic section, control elements associated with said non-magnetic section, and means controlled by said control elements for resetting said device to avoid such condition and operable one or more times for obtaining other vehicle conditions in succession.

16. Vehicle controlling apparatus including control stations at desired points of the vehicle track each including control elements, means operable to obtain a predetermined vehicle condition, means for normally restraining the operation of said means and controlled by one of said control elements for releasing the firstnamed means when passing the control station, means for retarding the operation of the first-named means according to the movement of the vehicle, to withhold such vehicle condition until a predetermined distance of travel of the vehicle has been made, and means controlled by another control element for returning the first-named means to inoperative position.

17. Vehicle controlling apparatus including a run-down device on the vehicle, means for normally restraining the operation of said device and releasing same for operation when passing a control station of the track, means for resetting said device when passing the control station, and means for obtaining different vehicle conditions in succession when said device runs down different distances.

18. Vehicle controlling apparatus including a run-down device on the vehicle, means for normally restraining the operation of said device and releasing same for operation when passing a control station of the track, means for resetting said device when passing the control station, an electrical circuit controlled by said device for obtaining one vehicle condition when the device has run down part way, and another electrical circuit controlled by said device for obtaining another vehicle condition when the device has run down further.

19. Vehicle controlling apparatus including a run-down device on the vehicle, means for normally restraining the operation of said device and releasing same for operation when passing a control station of the track, means for obtaining one vehicle condition when said device has run down part way, means for obtaining another vehicle condition when said device has run down further, means for resetting said device, and controlling means on the track at the control station controlling said resetting means to permit the device to run down part way when part of the controlling means is inactive and to permit said device to run down further when the entire controlling means are inactive.

20. Vehicle controlling apparatus including a run-down device on the vehicle operable according to the movement of the vehicle, means for normally restraining the operation of said device and releasing same for operation when passing a control station of the track, means for obtaining different vehicle conditions when said device runs down different distances, control elements on the track at different longitudinal points thereof at the control station, and means controlled by said elements for resetting said device, said device being permitted to run down, when passing one of said elements in inactive condition, to obtain one vehicle condition, and said device being permitted to run down further when passing more than one of the control elements in inactive condition to obtain another vehicle condition.

21. Vehicle controlling apparatus including a run-down device on the vehicle, means for normally restraining the operation of said device and releasing same for operation when passing a control station of the track, electrical circuits adapted to be broken in succession when said device runs down different distances to obtain different vehicle conditions accordingly, control elements on the track at different longitudinal points at the control station, and means controlled by said control elements for resetting said device, said device being permitted to run down different distances in passing one or more of said elements in inactive condition.

22. Vehicle controlling apparatus including a run-down device on the vehicle, means for obtaining two different vehicle conditions when said device runs down different distances, means for normally restraining the operation of said device and for releasing said device for operation when passing a control station of the track, and means operable, when passing such control station, for resetting said device one or more times to avoid one or both of said conditions.

23. Vehicle controlling apparatus including a run-down device on the vehicle, means for obtaining two different vehicle conditions when said device runs down different distances, control elements at each control station of the track, means for restraining the operation of said device and controlled by one of said elements for releasing said device for operation when passing the control station, and means controlled by the control elements for resetting said device one or more times when passing the control station to avoid one or both of said conditions.

24. Vehicle controlling apparatus including a run-down device on the vehicle, means for obtaining two different vehicle conditions when said device runs down different distances, a non-magnetic section in the track at each control station, means for restraining the operation of said device and having a responsive relation with the track for releasing said device when passing the non-magnetic section, control elements associated with said non-magnetic section, and means controlled by said control elements for resetting said device one or more times when passing the non-magnetic section to avoid one or both of said conditions.

25. Vehicle controlling apparatus including control stations at desired points of the vehicle track each including primary and secondary control elements, normally inactive vehicle carried means operable by a run-down motion at a speed according to the vehicle speed to obtain a predetermined vehicle condition after the vehicle has moved a predetermined distance when passing the primary control element of a station, means effective under such condition to establish speed restriction of the vehicle, and means controlled by the secondary control elements during such distance of movement of the vehicle to avoid the first named condition and to set aside the speed restriction when passing a control station.

26. Vehicle controlling apparatus including control stations at desired points of the vehicle track each including primary and secondary control elements, a run-down device on the vehicle for obtaining an ultimate vehicle condition when the vehicle has moved a predetermined distance, means for normally restraining the operation of said device while the vehicle is moving between control stations and controlled by the primary control element, when passing a control station, to release said device for operation, speed restricting means operable under such conditions, and means controlled by the secondary control elements for resetting said device during such distance or movement of the vehicle, when passing a control station, to avoid such condition, and also operable for setting aside the operation of said speed restricting means.

27. Vehicle controlling apparatus including control stations at desired points of the track each including primary and secondary control elements, a run-down device operable to obtain a vehicle condition, means normally restraining the operation of said device and controlled by the primary control element, when passing the control station, for releasing said device for operation, speed restricting means operable under such condition, means controlled by the secondary control elements for resetting said device to avoid said condition, and means also controlled by the secondary control elements, and operable when the run-down device is in a predetermined position, for setting aside the operation of the speed restricting means.

28. Vehicle controlling apparatus including control stations at desired points of the track each including primary and secondary control elements, a run-down device for obtaining a predetermined vehicle condition, means normally restraining the operation of said device and controlled bp the primary control element, when passing the control station, for releasing said device, means controlled by the secondary control elements for resetting said device to avoid such condition, and requiring the run-down device to be in a predetermined position, means operable by the response of the lastnamed means to a secondary control element for establishing such condition, and means operable with the resetting means to prevent the lastnamed means being effective.

29. Vehicle controlling apparatus including control stations at desired points of the track each including primary and secondary control elements, a run-down device for obtaining a predetermined vehicle condition, means for restraining the operation of said device and controlled by the primary control element, when passing the control station, to release said device for operation, means responsive to the secondary control elements, means controlled by said responsive means, when the run-down device is in a predetermined position, for resetting said device, means operable by the response of said responsive means to obtain such condition, and means operable with the resetting means to prevent the lastnamed means from being effective.

30. In a vehicle control apparatus, a run-down device including a wheel, a rundown member having a portion to engage the wheel so as to move with the wheel for a predetermined angle of movement of said wheel and to become disengaged from the wheel after such movement of the wheel, means for resetting said member, and means for obtaining a predetermined condition when said member has run down and become disengaged from said wheel.

31. In a vehicle controlling apparatus, a run-down device including a wheel having a toothed edge, a run-down member having a portion to engage said toothed edge of the wheel so as to move with the wheel for a predetermined angle of movement of the wheel and to then become disengaged from the wheel, means for resetting said member, and means for obtaining a predetermined vehicle condition when said member has run down and become disengaged from said wheel 32. In a vehicle controlling apparatus, a run-down device including a member movable when the vehicle is moving, a run-down member to engage said member for movement therewith and to become disengaged from said member, means for resetting the secondnamed member when the members are in engagement, and means for obtaining a predetermined vehicle condition when the secondnamed member has run down and become disengaged from the firstnamed member.

33. In a vehicle controlling apparatus, control stations at desired points of the vehicle track each including a non-magnetic rail section in the track, a responsive element comprising a transformer inductively associated with a rail of the track to provide impedance in the transformer when passing the non-magnetic rail section, means for energizing one winding of the transformer to induce current in the other winding, and controlling means in circuit with the lastnamed winding normally energized by the induced current and deenergized when the aforesaid impedance occurs in the transformer.

34. In a vehicle controlling apparatus, control stations at desire points of the vehicle track each including a non-magnetic rail section in the track, a core having its ends adjacent to a rail of the track in inductive relation therewith so that the magnetic circuit of the core is completed by the iron or magnetic portion of the rail and is interrupted by the non-magnetic rail section, two windings on said core, means for energizing one winding to induce current in the other winding, and controlling means in circuit with the lastnamed winding normally energized by the induced current and de-energized by the impedance which occurs in the core and coils when the core passes a non-magnetic rail section.

35. In a vehicle controlling apparatus, track controlled electrical means for changing circuit connections and for establishing a speed control circuit, a speed control governor, contact means controlled by the governor for said circuit requiring the vehicle speed to be retarded a predetermined amount, other contact means for said circuit controlled by the speed governor to enable the speed to be increased to a predetermined maximum, and means for changing circuit connections from the firstnamed to the secondnamed contact means when the vehicle speed has been retarded the required amount.

36. In a vehicle controlling apparatus, track controlled electrical means for changing circuit connections and for establishing a speed control circuit, a speed control governor, contact means controlled by the governor for said circuit requiring the vehicle speed to be retarded a predetermined amount, other contact means for said circuit controlled by the speed governor to enable the speed to be increased to a predetermined maximum speed, and means for changing circuit connections from the firstnamed to the secondnamed contact means when the vehicle speed has been retarded the required amount and operable to change the circuit connections back from the secondnamed to the firstnamed contact means when such maximum speed is exceeded.

37. In a vehicle controlling apparatus, track controlled electrical means for changing circuit connections and for establishing a speed control circuit, a speed control governor, contact means controlled by the governor to keep said circuit open until the vehicle speed is retarded a predetermined amount, other contact means for said circuit controlled by the governor for breaking said circuit at a predetermined maximum speed above the aforesaid retarded speed, and means for changing the circuit connections from the firstnamed to the secondnamed controlling means when the circuit is closed through the firstnamed contact means.

38. In a vehicle controlling apparatus, track controlled electrical means for changing circuit connections and for establishing a speed control circuit, a speed control governor, contact means controlled by the governor to keep said circuit open until the vehicle speed is retarded a predetermined amount, other contact means for said circuit controlled by the governor for breaking said circuit at a predetermined maximum speed above the aforesaid retarded speed, and means for changing the circuit connections from the firstnamed to the secondnamed controlling means when the circuit is closed through the firstnamed contact means, and operable for restoring the circuit connections from the secondnamed to the firstnamed contact means if such predetermined maximum speed is exceeded so as to again enforce the first named retarding condition.

39. In a vehicle controlling apparatus, track controlled electrical means for changing circuit connections and for establishing a speed control circuit, a speed control governor, contact means controlled by the governor including two contact members for said circuit, one contact member normally being in the circuit and requiring the vehicle speed to be retarded a predetermined amount, and means for changing the circuit connections from said contact member to the other contact member when the vehicle has been retarded the predetermined amount, the secondnamed contact member permitting the speed to be increased to a predetermined maximum.

40. In a vehicle controlling apparatus, track controlled electrical means for changing circuit connections and for establishing a speed control circuit, a speed control governor, contact means controlled by the governor including two contact members for said circuit, one contact member normally being in said circuit and requiring the vehicle speed to be retarded a predetermined amount, and means in said circuit and operable for changing circuit connections from the firstnamed contact member to the other contact member when the vehicle speed has been retarded said predetermined amount, the secondnamed contact member permitting the speed to be increased to a predetermined maximum, and the lastnamed means being operable to restore the circuit connections from the secondnamed to the firstnamed contact member when such maximum speed is exceeded.

41. In a vehicle controlling apparatus, track controlled electrical means for changing circuit connections and establishing a speed control circuit, a speed control governor, contact means controlled by said governor including two contact members for said circuit, one contact member being such as to keep said circuit open until the vehicle speed has been retarded a predetermined amount, and means for changing circuit connections, when said circuit is closed, from the firstnamed contact member to the other contact member, the secondnamed contact member keeping the circuit closed until a predetermined maximum speed.

42. In a vehicle control apparatus, track controlled electrical means for changing circuit connections and for establishing a speed control circuit, a speed control governer, contact means controlled by said governor including two contact members for said circuit, one contact member being such as to keep the circuit open and require the vehicle speed to be retarded a predetermined amount to close the circuit, a magnet in said circuit, switch means for changing the circuit connections from the firstnamed contact member to the other contact member when said magnet is energized, the second contact member keeping the circuit closed until a predetermined maximum speed is reached, and said switch means restoring the circuit connections from the secondnamed contact member to the firstnamed contact member when the magnet is deenergized by the opening of the circuit.

43. In a vehicle controlling apparatus, a governor operated by the movement of the vehicle, means rendered inoperative when the governor stops, and means for preventing said means becoming inoperative when an intentional stop of the vehicle is made.

44. In a vehicle controlling apparatus, a governor operated by the movement of the vehicle, means rendered inoperative when the governor stops, and means controlled by the power controlling member of the vehicle for preventing said means becoming inoperative when said member is moved to shut off the power.

45. In a vehicle controlling apparatus, a governor operated by the movement of the vehicle, means rendered inoperative when the governor stops including an electrical circuit broken by the stopping of the governor, and means for bridging said circuit, when an intentional stop is made, to keep the circuit closed under such condition.

46. In a vehicle controlling apparatus, a governor operated by the movement of the vehicle, an electrical circuit opened when the governor stops for obtaining a predetermined condition, a power controlling member for the vehicle, and means so arranged that when said member is moved to shut off the power the circuit is bridged to keep it closed when the governor stops by an intentional stop of the vehicle.

47. In a vehicle controlling apparatus, a run-down device including a member operable by the movement of the vehicle and another member to move therewith for obtaining an ultimate vehicle condition, means for resetting the secondnamed member, means for obtaining a predetermined condition when the firstnamed member stops moving, and means for preventing the lastnamed condition being established when an intentional stop of the vehicle is made.

48. In a vehicle controlling apparatus, a run-down device for obtaining an ultimate vehicle condition, means for resetting said device, a governor operated from said device to assure of said device being operative, an electrical circuit broken by said governor when the governor stops for obtaining a predetermined condition, and means for bridging said circuit to keep it closed when an intentional stop is made.

49. In a control apparatus, a movable control member, a spring for moving said member, an electrical circuit, and means in said circuit opposing the effort of the spring and operable independent of the position of said control member for opening said circuit when the spring weakens.

50. In a control apparatus, a movable control member, a spring for moving said member, and an electrical circuit including members held together by said spring independent of the position of said control member and adapted to separate when the spring weakens, so as to break the circuit.

51. In a controlling apparatus, a movable control member, a spring for moving said member, a contact, a weight held against said contact by the spring when the spring independent of the position of the control member is active and movable away from the contact when the spring weakens, and an electrical circuit including said contact and weight.

52. In a controlling apparatus, a movable control member, a contact, a weight movable independent of the control member to engage said contact, a circuit including said contact and weight to be broken by the separation of said weight and contact, and spring means between said control member and weight for moving said control member and holding the weight against said contact, said weight being movable away from the contact when the spring weakens or breaks.

53. In a vehicle controlling apparatus, control stations at desired points of the vehicle track each including a non-magnetic rail section in the track, a device carried by the vehicle and in responsive relation to the magnetic and non-magnetic sections of rail, means for obtaining a predetermined vehicle condition when said device passes non-magnetic rail sections, and means operable when passing long non-magnetic rail sections between or beyond control stations for suspending the establishment of such condition.

54. In a vehicle controlling apparatus, control stations at desired points of the vehicle track each including a non-magnetic rail section in the track, means carried by the vehicle in responsive relation with the track for obtaining a predetermined vehicle condition when passing non-magnetic sections, a track element at the entrance end of long non-magnetic track sections between or beyond control stations, and means responsive to said element for avoiding said condition and rendered ineffective when the firstnamed means reaches a non-magnetic portion of the track.

55. In a vehicle controlling apparatus, control stations at desired points of the vehicle track each including a non-magnetic rail section in the track, means carried by the vehicle in responsive relation with the track for obtaining a predetermined vehicle condition when passing non-magnetic track sections, a track element at the entrance end of long non-magnetic track sections between or beyond control stations, a responsive device on the vehicle controlled by said element, an electrical circuit established by the response of said device to said element to avoid said condition and arranged to be broken when the firstnamed means respond to a magnetic portion of the track, and means in said circuit for retaining said device in responded condition while the circuit is closed.

56. In a vehicle controlling apparatus, control stations at desired points of the vehicle track each including a non-magnetic rail section in the track, a run-down device for obtaining a predetermined control condition, means for restraining the operation of said device and having a responsive relation with the track for releasing said device when passing said non-magnetic track sections, and means operable when passing predetermined long non-magnetic track sections for preventing such condition being established.

57. In a vehicle controlling apparatus, control stations at desired points of the vehicle track each including a non-magnetic rail section in the track, a run-down device for obtaining a predetermined control condition, a track element at the entrance end of a non-magnetic track section between or beyond control stations, and means responsive to said element for avoiding such condition while said device is run down and rendered inoperative when said device is reset.

58. In a vehicle controlling apparatus, control stations at desired points of the vehicle track each including a non-magnetic rail section in the track, a run-down device on the vehicle for obtaining a predetermined vehicle condition, means for suspending the operation of said device and in responsive relation with the track for releasing said device when passing non-magnetic rail sections, a track element at the entrance end of a non-magnetic track section between or beyond control stations, a responsive device controlled by said element, an electrical circuit established when said run-down device has run down part way and when said responsive device responds to said track element, said circuit, when established, avoiding said condition, said circuit being opened when said run-down device is reset, and means in said circuit for maintaining said responsive device in responded condition, said responsive device returning to normal when the lastnamed means is affected by the opening of the circuit.

59. In a vehicle controlling apparatus, a responsive device to pass magnetic and non-magnetic portions on the track and including a winding, a magnet in circuit with said winding, means for energizing said winding, means held by said magnet and released by a reduction in the flow of current through the magnet, for obtaining a predetermined vehicle condition, a second magnet in circuit with said winding, and means controlled by the second magnet for obtaining a predetermined vehicle condition when no current flows through the second magnet.

60. Vehicle controlling apparatus including a vehicle equipment having inductive means in inductive relation with the track and translating means controlled by said inductive means to produce unfavorable conditions in the vehicle equipment when there is an interruption in said inductive relation, and means for automatically eliminating control of said translating means for said conditions by said inductive means when passing a portion of the track not adapted to have inductive relation with said inductive means.

61. Vehicle controlling apparatus including a vehicle equipment having inductive receiving means in inductive relation with the track and translating means controlled by said receiving means to produce unfavorable conditions in the vehicle equipment when there is an interruption in said inductive relation, means for automatically eliminating control of said translating means for said condition by the receiving means and controlled by said receiving means, and means on the track for influencing said receiving means to render the thirdnamed means effective.

62. Vehicle controlling apparatus including vehicle-carried means for producing an unfavorable condition of vehicle control, inductively cooperable means on the track and vehicle arranged to continuously control the firstnamed means while traveling in a zone between predetermined points of the track to avoid said condition and to obtain, when there is an interruption in the inductive cooperation, said condition, and means for automatically eliminating control of the firstnamed means by the secondnamed means for said condition and controlled by the secondnamed means when passing out of said zone to render the thirdnamed means effective.

63. Vehicle controlling apparatus including a vehicle equipment having inductive means in inductive relation with magnetic portions of the vehicle track and translating means controlled by said inductive means to produce unfavorable conditions in the vehicle equipment when said inductive means passes non-magnetic portions of the vehicle track, and means for automatically eliminating control of said translating means by said inductive means for said condition when passing predetermined non-magnetic portions of the track with said inductive relation interrupted.

64. Vehicle controlling apparatus including a vehicle equipment having inductive means in inductive relation with magnetic portions of the vehicle track and translating means controlled by said inductive means to produce unfavorable conditions in the vehicle equipment when said inductive means moves along non-magnetic portions of the track, means for eliminating control of said translating means by said inductive means during interruption in said inductive relation and including inductive receiving means, and inductive means on the track at the entrance end of a non-magnetic portion of the track to influence said receiving means to render the third named effective.

In testimony whereof I hereunto affix my signature.

ALFRED L. RUTHVEN.